US010582272B2

(12) United States Patent
Okada et al.

(10) Patent No.: US 10,582,272 B2
(45) Date of Patent: Mar. 3, 2020

(54) DATA PROCESSING DEVICE AND DATA PROCESSING METHOD FOR PROCESSING A STREAM

(71) Applicant: SONY CORPORATION, Tokyo (JP)

(72) Inventors: Satoshi Okada, Tokyo (JP); Takashi Yokokawa, Kanagawa (JP); Naoki Yoshimochi, Kanagawa (JP); Makiko Yamamoto, Tokyo (JP)

(73) Assignee: SONY CORPORATION, Tokyo (JP)

(*) Notice: Subject to any disclaimer, the term of this patent is extended or adjusted under 35 U.S.C. 154(b) by 163 days.

(21) Appl. No.: 14/917,465

(22) PCT Filed: Nov. 19, 2014

(86) PCT No.: PCT/JP2014/080578
§ 371 (c)(1),
(2) Date: Mar. 8, 2016

(87) PCT Pub. No.: WO2015/083542
PCT Pub. Date: Jun. 11, 2015

(65) Prior Publication Data
US 2016/0227292 A1 Aug. 4, 2016

(30) Foreign Application Priority Data
Dec. 3, 2013 (JP) ................. 2013-249745

(51) Int. Cl.
H04N 21/61 (2011.01)
H04L 12/64 (2006.01)
(Continued)

(52) U.S. Cl.
CPC ..... H04N 21/6143 (2013.01); H04L 12/6418 (2013.01); H04L 65/4076 (2013.01);
(Continued)

(58) Field of Classification Search
None
See application file for complete search history.

(56) References Cited

U.S. PATENT DOCUMENTS 7,607,154 B2 10/2009 Morello
9,883,256 B2 * 1/2018 Morello ............... H04L 1/0003
(Continued)

FOREIGN PATENT DOCUMENTS

EP 2 362 653 A1 8/2011
EP 2725787 A2 4/2014
(Continued)

OTHER PUBLICATIONS

Gomez-Barquero, David, "Next Generation Mobile Broadcasting" Boca Raton, FL: CRC Press, Mar. 26, 2013, pp. 494-495 (Year: 2013).*
(Continued)

Primary Examiner — Thomas J Dailey
(74) Attorney, Agent, or Firm — Oblon, McClelland, Maier & Neustadt, L.L.P.

(57) ABSTRACT

The present technology relates to a data processing device and a data processing method capable of appropriately processing a stream. NPs included in a division stream of a predetermined channel acquired by dividing an input stream configured by a plurality of packets into division streams of a plurality of channels are eliminated, and a NP-eliminated stream including DNP representing the number of eliminated NPs is generated. Then, a stream including the NP-eliminated stream and signaling as a size identifier representing a size of the DNP or a stream including the NP-eliminated stream and a buffer capacity of a buffer storing the NP-eliminated stream and signaling as read start time from the buffer so as to generate a NP-inserted stream acquired by inserting NPs corresponding to a number represented by the DNP into the NP-eliminated stream is
(Continued)

generated. The present technology, for example, can be applied to a channel bonding (CB) technology for dividing an input stream into a plurality of channels and transmitting divided streams.

10 Claims, 20 Drawing Sheets

(51) Int. Cl.
    *H04L 29/06*     (2006.01)
    *H04N 21/236*     (2011.01)

(52) U.S. Cl.
    CPC . *H04N 21/23608* (2013.01); *H04N 21/23611* (2013.01); *H04N 21/23614* (2013.01)

(56) References Cited

U.S. PATENT DOCUMENTS

| | | | |
|---|---|---|---|
| 2004/0073929 A1* | 4/2004 | Morello | H04L 1/0003 725/63 |
| 2009/0116508 A1* | 5/2009 | Kobayashi | H04N 21/23608 370/465 |
| 2010/0284472 A1* | 11/2010 | Liao | H04N 21/4305 375/240.26 |
| 2011/0164703 A1* | 7/2011 | Yokokawa | H04H 40/18 375/316 |
| 2012/0307842 A1 | 12/2012 | Petrov et al. | |
| 2012/0314762 A1* | 12/2012 | Herrmann | H04N 21/2362 375/240.02 |
| 2012/0327955 A1 | 12/2012 | Herrmann et al. | |
| 2014/0341103 A1* | 11/2014 | Hwang | H04W 72/005 370/312 |
| 2015/0063357 A1* | 3/2015 | Hwang | H04L 5/0044 370/392 |
| 2015/0237175 A1* | 8/2015 | Michael | H04N 21/2381 370/474 |
| 2016/0037192 A1 | 2/2016 | Petrov et al. | |

FOREIGN PATENT DOCUMENTS

| | | | | |
|---|---|---|---|---|
| JP | 2013-520035 A | | 5/2013 | |
| WO | WO-2010143861 A2 * | | 12/2010 | H04B 7/0413 |
| WO | WO 2011/091850 A1 | | 8/2011 | |
| WO | 2012/0177062 A2 | | 12/2012 | |

OTHER PUBLICATIONS

ETSI EN 302 307-1 V1.4.1, "Digital Video Broadcasting (DVB); Second Generation Framing Structure, Channel Coding and Modulation Systems for Broadcasting, Interactive Services, News Gathering and Other Broadband Satellite Applications; Part 1: DVB-S2", European Standard, Nov. 2014, 80 pages.
International Search Report dated Feb. 24, 2015, in PCT/JP2004/080578 filed Nov. 19, 2014.
ETSI EN 302 307 V1.2.1, "Digital Video Broadcasting (DVB); Second-generation framing structure, channel coding and modulation systems for Broadcasting, Interactive Services, news Gathering and other broadband satellite application (DVB-S2)," European Telecommunications Standards Institute, Aug. 2009 (78 pages).
ETSI EN 302 755 V1.3.1, "Digital Video Broadcasting (DVB); Frame structure channel coding and modulation for a second generation digital terrestrial television broadcasting system (DVB-T2)," European Telecommunications Standards Institute, Apr. 2012 (11 pages).
Extended European Search Report dated Mar. 16, 2017 in Patent Application No. 14867046.6.
Final draft ETSI EN 302 755 V1.3.1, "Digital Video Broadcasting (DVB); Frame Structure Channel Coding and Modulation for a Second Generation Digital Terrestrial Television Broadcasting System (DVB-T2)," ETSI, vol. 302 755, No. v1.3.1, XP002728444, Nov. 1, 2011, 6 pages (pp. 17-21 and cover page).
ETSI EN 302 307 V1.3.1, "Digital Video Broadcasting (DVB); Second Generation Framing Structure, Channel Coding and Modulation Systems for Broadcasting, Interactive Services, News Gathering and Other Broadband Satellite Applications (DVB-S2)", European Standard, ETSI, vol. BROADCAS, No. V1.3.1, XP014156243, Mar. 1, 2013, 84 pages.
Office Action dated Aug. 9, 2018 in Japanese Patent Application No. 2015-551452 (with English translation).
CN Notification of the First Office Action, dated Jul. 3, 2018 in Application No. 2014800651693; Issue No. 2018062802145920 with English translation, 16 pages.
Office Action issued in corresponding European Application No. 14 867 046.6 dated Feb. 28, 2019, 8 pages.
Digital Video Broadcasting (DVB), "User Guidelines for the Second Generation System for Broadcasting, Interactive Services, News Gathering and Other Broadband Satellite Applications," draft ETSI TR 1XX XXX V1.1.1, 2004, 14 pages.
Office Action issued in corresponding Japanese Application No. 2015-551452 dated Jan. 8, 2019, 3 pages.
Digital Video Broadcasting (DVB), "Frame Structure Channel Coding and Modulation for a Second Generation," ETSI EN 302 755 vol. 1.3.1, Apr. 2012, pp. 139-144, 175, 24.

* cited by examiner

FIG. 17

ISSY field coding(2 or 3 bytes)

| First Byte | | | | | Second Byte | Third Byte | |
|---|---|---|---|---|---|---|---|
| bit-7(MSB) | bit-6 | bit-5 and bit-4 | bit-3 and bit-2 | bit-1 and bit-0 | bit-7 to bit-0 | bit-7 bit-0 | |
| 0=ISCR<sub>short</sub> | MSB of ISCR<sub>short</sub> | next 6 bits of ISCR<sub>short</sub> | | | next 8 bits of SCR<sub>short</sub> | not present | ISCR (TIME INFORMATION) |
| 1 | 0= ISCR<sub>long</sub> | 6 MSBs of ISCR<sub>long</sub> | | | next 8 bits of ISCR<sub>long</sub> | next 8 bits of ISCR<sub>long</sub> | |
| 1 | 1 | 00=BUFS | BUFS unit 00=bits 01=Kbits 10=Mbits 11=reserved | 2 MSBs of BUFS | next 8 bits of BUFS | not present when ISCR<sub>short</sub> is used;else reserved | BUFS (REQUIRED Buffer AMOUNT) |
| 1 | 1 | 10=BUFSTAT | BUFSTAT unit 00=bits 01=Kbits 10=Mbits 11=reserved | 2 MSBs of BUFSTAT | next 8 bits of BUFSTAT | not present when ISCR<sub>short</sub> is used;else reserved | BUFSTAT (READ START TIME) |

FIG. 18

BB Header | BBHeader (Mode Adaptation characteristics) and Slicing Policy for Single Transport Stream Broadcast services

| Application area/configuration | MATYPE-1 | MATYPE-2 | UPL | DFL | SYNC | SYNCD | CRC-8 | Slicing policy |
|---|---|---|---|---|---|---|---|---|
| Broadcasting services/ CCM, single TS | 11-1-1-0-0-Y | XXXXXXX | 188D×8 | $K_{bch}$−80D | 47HEX | Y | Y | Break No timeout No Padding No Dummy frame |

X=not defined;Y=according to configuration/computation.
Break=break packets in subsequent DATAFIELDs;Timeout:maximum delay in merger/slicer buffer.

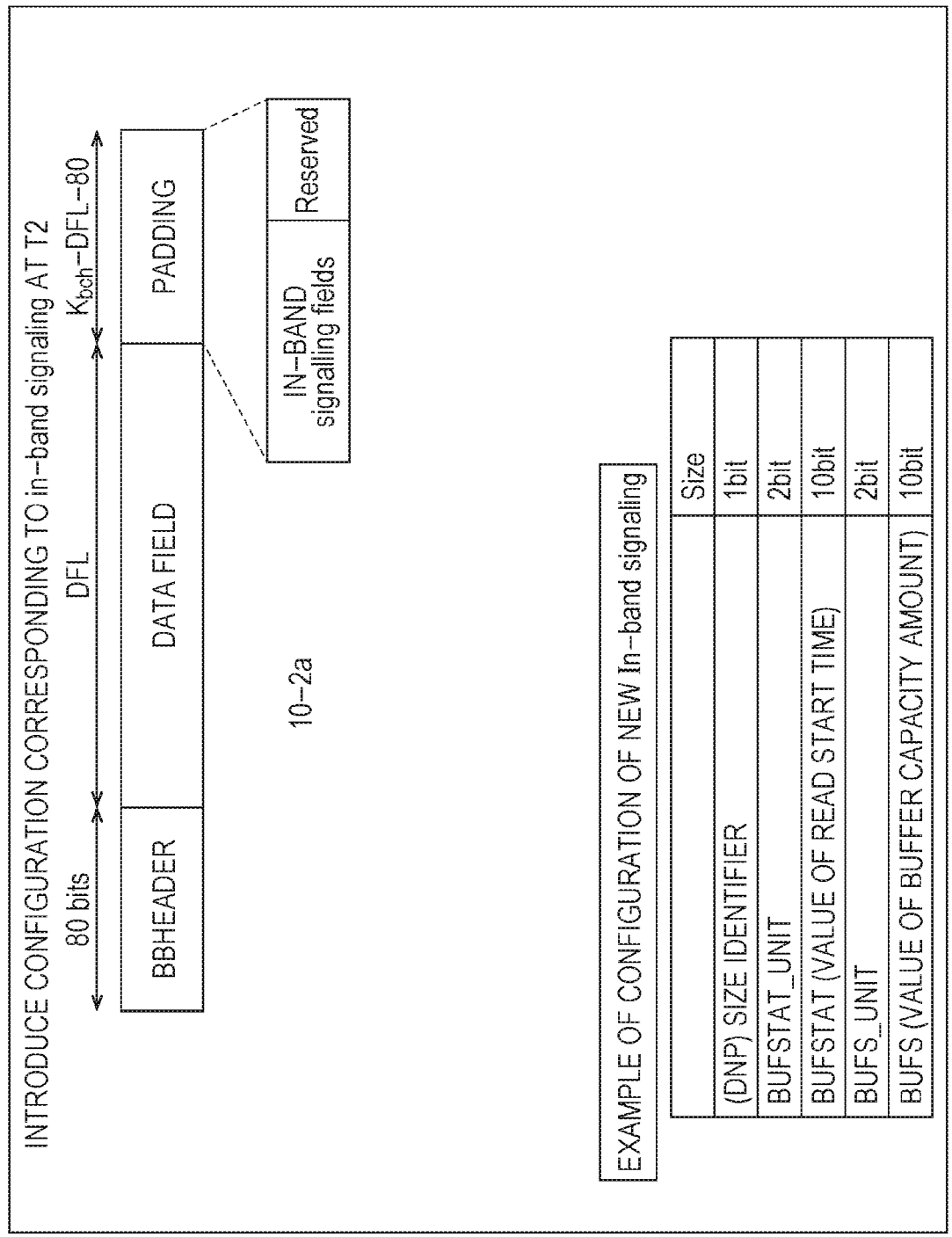

DATA PROCESSING DEVICE AND DATA PROCESSING METHOD FOR PROCESSING A STREAM

TECHNICAL FIELD

The present technology relates to a data processing device and a data processing method, and more particularly, to a data processing device and a data processing method, for example, capable of appropriately processing a stream.

BACKGROUND ART

As a broadcasting system of digital broadcasting, for example, there are a digital video broadcasting (DVB)-S2 employed in Europe and the like (Non-Patent Document 1).

CITATION LIST

Non-Patent Document

Non-Patent Document 1: DVB-S.2: ETSI EN 302 307 V1.2.1 (2009-08)

SUMMARY OF THE INVENTION

Problems to be Solved by the Invention

In digital broadcasting, as one of technologies for transmitting a stream of a high data rate, there is a channel bonding (CB) technology for transmitting a stream of a high data rate in a state where the stream is divided into streams of a plurality of channels on a transmission side and reconfiguring the streams of the plurality of channels into the original stream of the high data rate on a reception side.

At present, while a standard called DVB-S2x (or DVB-S.2 evo) is in the middle of formulation as a standard revising DVB-S2, in DVB-S2x, the employment of the CB technology has been reviewed.

However, currently, since details of the CB technology have not been defined, in digital broadcasting of DVB-S2x and the like, there is a concern that a stream cannot be appropriately processed even when the CB technology is employed.

The present technology is devised in view of such situations and enables an appropriate process of a stream.

Solutions to Problems

A first data processing device of the present technology includes: an elimination unit that eliminates null packets (NP) included in a division stream of a predetermined channel acquired by dividing an input stream configured by a plurality of packets into division streams of a plurality of channels and generates a NP-eliminated stream including deleted null packets (DNP) representing the number of eliminated NPs; and a generation unit that generates a stream including the NP-eliminated stream and signaling as a size identifier representing a size of the DNP.

A first data processing method of the present technology includes: eliminating null packets (NP) included in a division stream of a predetermined channel acquired by dividing an input stream configured by a plurality of packets into division streams of a plurality of channels and generating a NP-eliminated stream including deleted null packets (DNP) representing the number of eliminated NPs; and generating a stream including the NP-eliminated stream and signaling as a size identifier representing a size of the DNP.

According to the first data processing device and the first data processing method as described above, null packets (NP) included in a division stream of a predetermined channel acquired by dividing an input stream configured by a plurality of packets into division streams of a plurality of channels are eliminated, and a NP-eliminated stream including deleted null packets (DNP) representing the number of eliminated NPs is generated. Then, a stream including the NP-eliminated stream and signaling as a size identifier representing a size of the DNP is generated.

A second data processing device of the present technology includes: a processing unit that processes a stream transmitted from a data processing device including an elimination unit that eliminates null packets (NP) included in a division stream of a predetermined channel acquired by dividing an input stream configured by a plurality of packets into division streams of a plurality of channels and generates a NP-eliminated stream including deleted null packets (DNP) representing the number of eliminated NPs and a generation unit that generates a stream including the NP-eliminated stream and signaling as a size identifier representing a size of the DNP.

A second data processing method of the present technology includes: processing a stream transmitted from a data processing device including an elimination unit that eliminates null packets (NP) included in a division stream of a predetermined channel acquired by dividing an input stream configured by a plurality of packets into division streams of a plurality of channels and generates a NP-eliminated stream including deleted null packets (DNP) representing the number of eliminated NPs and a generation unit that generates a stream including the NP-eliminated stream and signaling as a size identifier representing a size of the DNP.

According to the second data processing device and the second data processing method according to the present technology as described above, a stream transmitted from a data processing device including: an elimination unit that eliminates null packets (NP) included in a division stream of a predetermined channel acquired by dividing an input stream configured by a plurality of packets into division streams of a plurality of channels and generates a NP-eliminated stream including deleted null packets (DNP) representing the number of eliminated NPs; and a generation unit that generates a stream including the NP-eliminated stream and signaling as a size identifier representing a size of the DNP is processed.

A third data processing device of the present technology includes: an elimination unit that eliminates null packets (NP) included in a division stream of a predetermined channel acquired by dividing an input stream configured by a plurality of packets into division streams of a plurality of channels and generates a NP-eliminated stream including deleted null packets (DNP) representing the number of eliminated NPs; and a generation unit that generates a stream including the NP-eliminated stream and a buffer capacity of a buffer storing the NP-eliminated stream and signaling as read start time from the buffer so as to generate a NP-inserted stream acquired by inserting NPs corresponding to a number represented by the DNP into the NP-eliminated stream.

A third data processing method of the present technology includes: eliminating null packets (NP) included in a division stream of a predetermined channel acquired by dividing an input stream configured by a plurality of packets into division streams of a plurality of channels and generating a NP-eliminated stream including deleted null packets (DNP) representing the number of eliminated NPs; and generating a stream including the NP-eliminated stream and a buffer capacity of a buffer storing the NP-eliminated stream and signaling as read start time from the buffer so as to generate a NP-inserted stream acquired by inserting NPs corresponding to a number represented by the DNP into the NP-eliminated stream.

According to the third data processing device and the third data processing method as described above, null packets (NP) included in a division stream of a predetermined channel acquired by dividing an input stream configured by a plurality of packets into division streams of a plurality of channels are eliminated, and a NP-eliminated stream including deleted null packets (DNP) representing the number of eliminated NPs is generated. Then, a stream including the NP-eliminated stream and a buffer capacity of a buffer storing the NP-eliminated stream and signaling as read start time from the buffer so as to generate a NP-inserted stream acquired by inserting NPs corresponding to a number represented by the DNP into the NP-eliminated stream is generated.

A fourth data processing device of the present technology includes: a processing unit that processes a stream transmitted from a data processing device including an elimination unit that eliminates null packets (NP) included in a division stream of a predetermined channel acquired by dividing an input stream configured by a plurality of packets into division streams of a plurality of channels and generates a NP-eliminated stream including deleted null packets (DNP) representing the number of eliminated NPs and a generation unit that generates a stream including the NP-eliminated stream and a buffer capacity of a buffer storing the NP-eliminated stream and signaling as read start time from the buffer so as to generate a NP-inserted stream acquired by inserting NPs corresponding to a number represented by the DNP into the NP-eliminated stream.

A fourth data processing method of the present technology includes: processing a stream transmitted from a data processing device including an elimination unit that eliminates null packets (NP) included in a division stream of a predetermined channel acquired by dividing an input stream configured by a plurality of packets into division streams of a plurality of channels and generates a NP-eliminated stream including deleted null packets (DNP) representing the number of eliminated NPs and a generation unit that generates a stream including the NP-eliminated stream and a buffer capacity of a buffer storing the NP-eliminated stream and signaling as read start time from the buffer so as to generate a NP-inserted stream acquired by inserting NPs corresponding to a number represented by the DNP into the NP-eliminated stream.

According to the fourth data processing device and the fourth data processing method as described above, a stream transmitted from a data processing device including: an elimination unit that eliminates null packets (NP) included in a division stream of a predetermined channel acquired by dividing an input stream configured by a plurality of packets into division streams of a plurality of channels and generates a NP-eliminated stream including deleted null packets (DNP) representing the number of eliminated NPs; and a generation unit that generates a stream including the NP-eliminated stream and a buffer capacity of a buffer storing the NP-eliminated stream and signaling as read start time from the buffer so as to generate a NP-inserted stream acquired by inserting NPs corresponding to a number represented by the DNP into the NP-eliminated stream is processed.

Here, the data processing device may be an independent device or an internal block configuring one device.

Effects of the Invention

According to the present technology, a stream can be appropriately processed.

Effects described here do not need to be comprehended in a limited manner, but there may any one of the effects described in the present disclosure.

BRIEF DESCRIPTION OF DRAWINGS

FIG. 17 is a diagram that illustrates the format of an ISSY.

FIG. 18 is a diagram that illustrates the format of a BB header.

FIG. 19 is a diagram that illustrates a method of transmitting a size identifier, a BUFS, and a BUFSTAT.

MODE FOR CARRYING OUT THE INVENTION

<Transmission System According to Embodiment of Present Technology>

Figure 1:
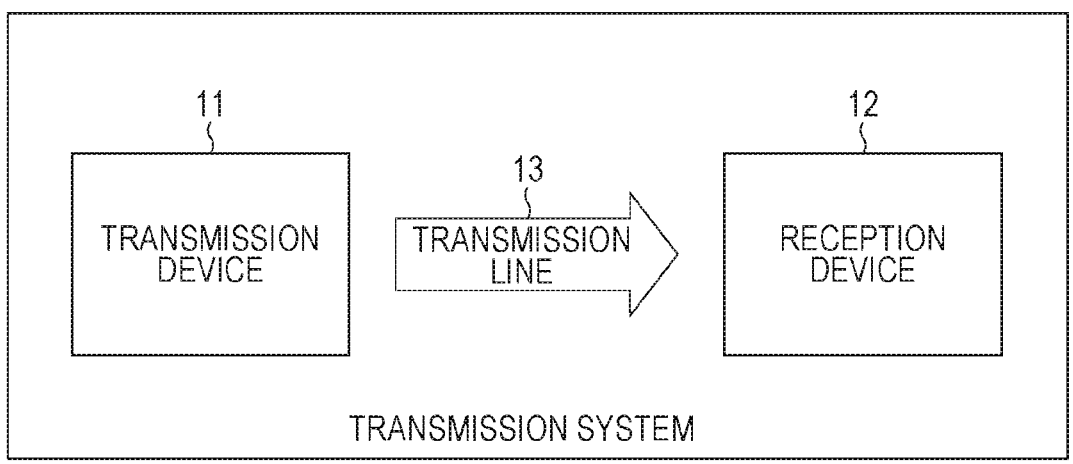
FIG. 1 is a block diagram that illustrates an example of the configuration of a transmission system according to an embodiment of the present technology.

FIG. 1 is a block diagram that illustrates an example of the configuration of a transmission system (here, a system represents a logical aggregation of a plurality of devices regardless whether or not the devices of configurations are disposed inside a same casing) according to an embodiment of the present technology.

As illustrated in FIG. 1, the transmission system is configured by a transmission device 11 and a reception device 12.

The transmission device 11, for example, performs transmission (digital broadcasting) (data transmission) of a program of television broadcasting or the like. In other words, the transmission device 11, for example, divides a stream of target data that is a transmission target such as image data and audio data as a program into streams of a plurality of channels by using a CB technology and transmits (transfers) the divided streams through a transmission line 13 such as a satellite link, a terrestrial wave, or a cable (wire circuit).

The reception device 12 receives streams of a plurality of channels transmitted from the transmission device 11 through the transmission line 13, restores the original stream, and outputs the restored original stream.

<Example of Configuration of Transmission Device 11>

Figure 2:
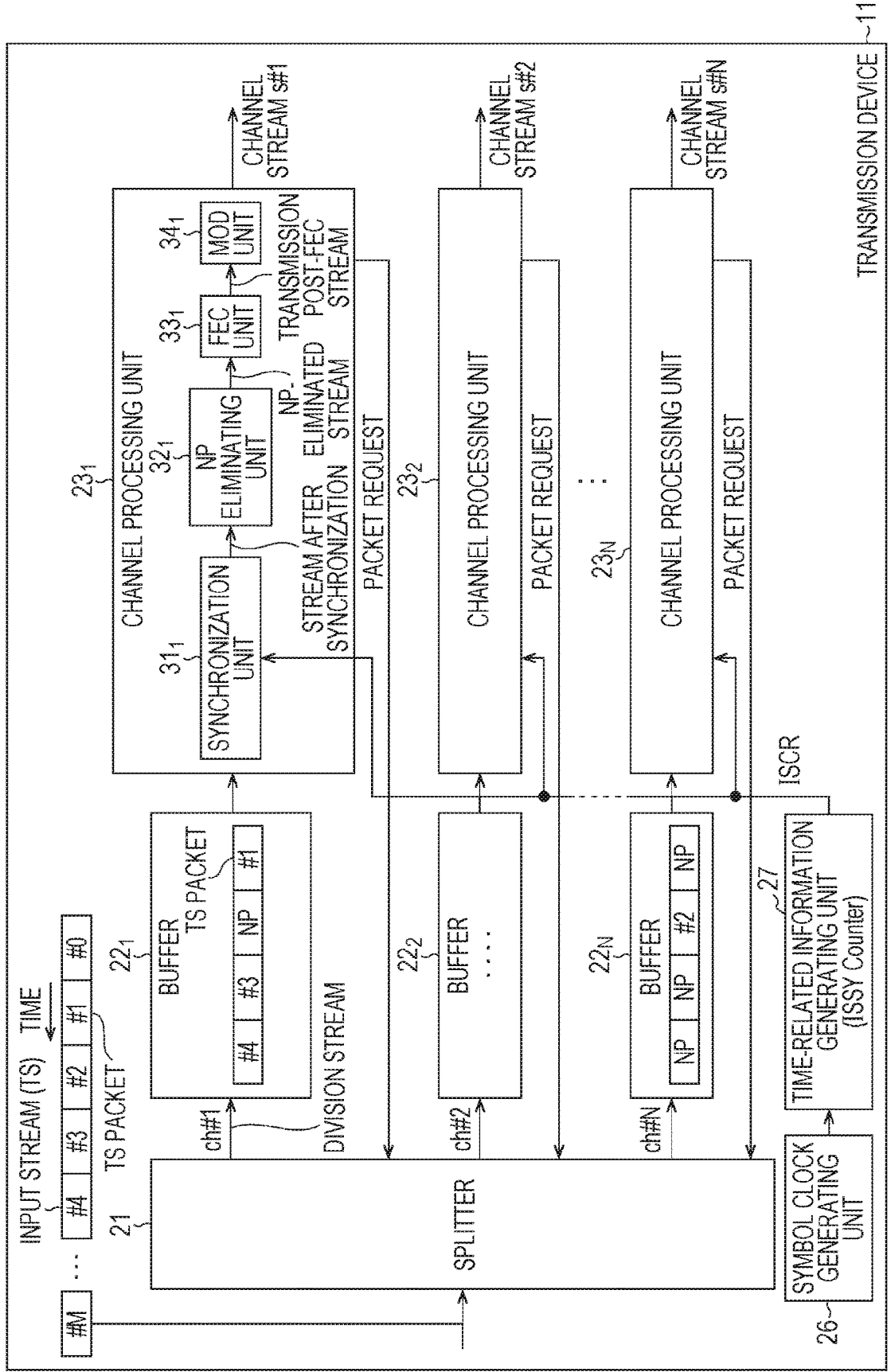
FIG. 2 is a block diagram that illustrates an example of the configuration of a transmission device 11.

FIG. 2 is a block diagram that illustrates an example of the configuration of the transmission device 11 illustrated in FIG. 1.

As illustrated in FIG. 2, the transmission device 11 includes: a splitter 21; N buffers $22_1$ to $22_N$; N channel processing units $23_1$ to $23_N$; a symbol clock generating unit 26; and a time-related information generating unit 27.

A transport stream (TS) having a high data rate of 100 Mega bit per second (Mbps) or the like, for example, configured by a plurality of TS packets #0, #1, . . . that is a stream of target data is supplied to the transmission device 11 as an input stream, and the transmission device 11 divides the input stream into division streams of N (or less) channels as a plurality of channels by using the CB technology and transmits the division streams.

An input stream is supplied to the splitter 21, and the splitter 21 receives the input stream supplied thereto and divides the input stream into N (or less) division streams of channels ch#1 to ch#N.

In other words, the splitter 21 repeats distributing the TS packet of the input stream to one channel among N channels ch#1 to ch#N and distributing a null packet (NP) to all the other channels for each TS packet of the input stream, thereby dividing the input stream into division streams of N channels ch#1 to ch#N.

Then, the splitter 21, in response to a request (packet request) from a channel processing unit $23_n$, supplies a division stream (packets thereof) of the channel ch#n (n-th channel) to the buffer $22_n$.

The buffer $22_n$, for example, is first in first out (FIFO) and sequentially stores division streams (packets thereof) of the channel ch#n supplied from the splitter 21 and sequentially supplies the stored division streams of the channel ch#n to the channel processing unit $23_n$.

The channel processing unit $23_n$ processes the division streams of the channel ch#n supplied from the buffer $22_n$ and transmits a channel stream s#1 of the channel ch#n acquired as a result thereof.

The channel processing unit $23_n$ includes: a synchronization unit $31_n$; a null packet (NP) eliminating unit $32_n$; a forward error correction (FEC) unit $33_n$; and a MOD (Modulation) unit $34_n$.

To the synchronization unit $31_n$, division streams of the channel ch#n are supplied from the buffer $22_n$, and an input stream time reference (ISCR) representing the transmission time of a packet that is one of input stream synchronizer's (ISSY), for example, defined in DVB-S2 and the like as time-related information relating to the transmission time of the packet and the like are supplied from the time-related information generating unit 27.

The synchronization unit $31_n$ adds the ISCR supplied from the time-related information generating unit 27 to the end of each packet of the division stream of the channel ch#n supplied from the buffer $22_n$ when the packet is supplied to the synchronization unit $31_n$ and supplies a stream acquired as a result thereof to the NP eliminating unit $32_n$ as a stream of the channel ch#n after synchronization.

The NP eliminating unit $32_n$ eliminates a NP from the stream of the channel ch#n after synchronization (a division stream in which an ISCR is added to each packet) supplied from the synchronization unit $31_n$ and supplies a stream acquired as a result thereof to the FEC unit $33_n$ as a NP-eliminated stream of the channel ch#n.

Here, as described above, as the NP is eliminated from the stream after synchronization by the NP eliminating unit $32_n$, the data rate of the NP-eliminated stream acquired as a result thereof decreases from the data rate of the input stream by an amount corresponding to the eliminated NP. Accordingly, the NP-eliminated stream of one channel can be transmitted using a transmission band that is narrower than that of a case where the input stream is transmitted.

The FEC unit $33_n$, for example, adds a base band (BB) header to one or more packets of the NP-eliminated stream of the channel ch#n supplied from the NP eliminating unit $32_n$ and adds in-band signaling defined in DVB-T2 and the like as is necessary, thereby functioning as a generation unit that generates a stream of a BB frame defined in DVB-S2 and the like.

In addition, the FEC unit $33_n$ performs error correction coding such as BCH coding or LDPC coding of a BB frame and supplies a stream of a BB frame acquired as a result thereof to the MOD unit $34_n$ as a transmission post-FEC stream of the channel ch#n.

The MOD unit $34_n$, for example, symbolizes the transmission post-FEC stream of the channel ch#n supplied from the FEC unit $33_n$ into a symbol for each predetermined number of bits and performs quadrature modulation of the symbol. Then, the MOD unit $34_n$ transmits a modulated signal acquired as a result of the quadrature modulation as a channel stream s#n of the channel ch#n.

The symbol clock generating unit 26 generates a symbol clock that is a clock of the rate of the symbol and supplies the generated symbol clock to the time-related information generating unit 27.

The time-related information generating unit 27 generates an ISSY such as an ISCR as time-related information in synchronization with a symbol clock supplied from the symbol clock generating unit 26 and supplies the generated ISSY to the channel processing units $23_1$ to $23_N$ (the synchronization units $31_1$ to $31_N$ thereof). Thus, at each time, an ISSY such as a same ISCR is supplied to all the channel processing units $23_1$ to $23_N$.

<Transmission Process>

Figure 3:
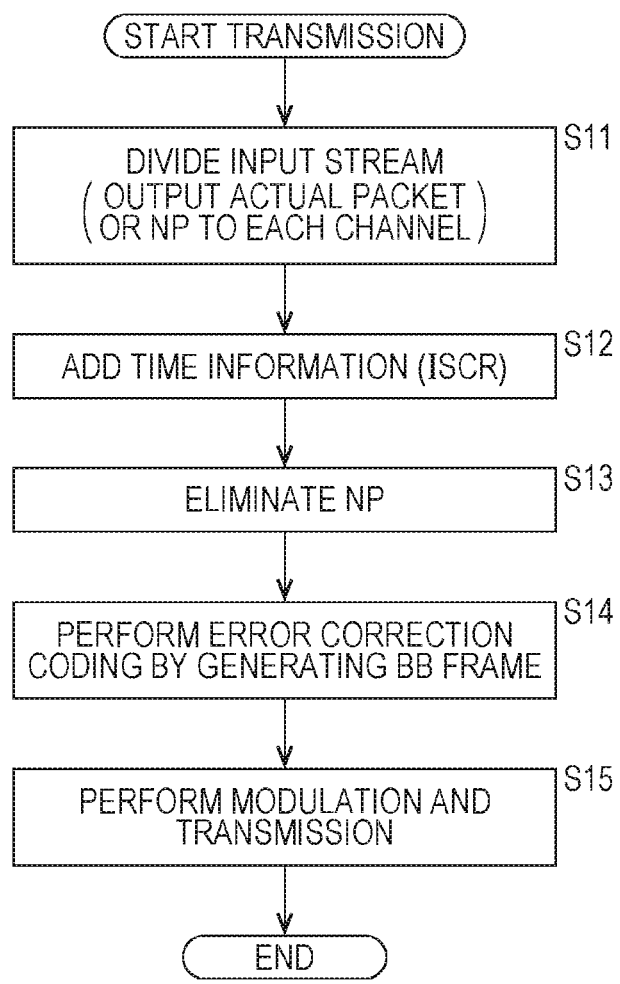
FIG. 3 is a flowchart that illustrates the process (transmission process) of the transmission device 11.

FIG. 3 is a flowchart that illustrates the process (transmission process) of the transmission device 11 illustrated in FIG. 2.

In step S11, the splitter 21 distributes each TS packet of an input stream supplied thereto to one channel among N channels ch#1 to ch#N and distributes a NP to all the other channels. Accordingly, the splitter 21 divides the input stream into division streams of N channels ch#1 to ch#N in which the TS packet of the input stream and a NP are present together and supplies the division stream of the channel ch#n to the buffer $22_n$.

The buffer $22_n$ sequentially stores the division stream of the channel ch#n supplied from the splitter 21 and sequentially supplies the stored division stream of the channel ch#n to the channel processing unit $23_n$, and the process proceeds to steps S11 to step S12.

In step S12, in the channel processing unit $23_n$, the synchronization unit $31_n$ adds an ISCR supplied form the time-related information generating unit 27 to the end of each packet of the division stream of the channel ch#n supplied from the buffer $22_n$ and supplies a stream acquired as a result thereof to the NP eliminating unit $32_n$ as a stream of the channel ch#n after synchronization, and the process proceeds to step S13.

In step S13, the NP eliminating unit $32_n$ eliminates a NP from the stream of the channel ch#n after synchronization (a division stream in which an ISCR is added to each packet) supplied from the synchronization unit $31_n$ and supplies a stream acquired as a result thereof to the FEC unit $33_n$ as a NP-eliminated stream of the channel ch#n, and the process proceeds to step S14.

In step S14, the FEC unit 33; adds a BB header to one or more packets of the NP-eliminated stream of the channel ch#n supplied from the NP eliminating unit $32_n$ and adds in-band signaling as is necessary, thereby generating a stream of a BB frame.

In addition, the FEC unit $33_n$ performs error correction coding of a BB frame and supplies a stream of a BB frame acquired as a result thereof to the MOD unit $34_n$ as a post FEC stream of the channel ch#n, and the process proceeds from step S14 to step S15.

In step S15, the MOD unit $34_n$ performs quadrature modulation of the transmission post-FEC stream of the channel ch#n supplied from the FEC unit $33_n$ and transmits a modulated signal acquired as a result of the quadrature modulation as a channel stream s#n of the channel ch#n, and the process ends.

Steps S11 to S15 of the transmission process illustrated in FIG. 3 are performed in a pipeline manner.

As above, the transmission device 11 forms a NP-eliminated stream by dividing the input stream into division streams of a plurality of N channels ch#1 to ch#N in which the TS packet of the input stream and a NP are present together and eliminating a NP included in the division stream of each channel ch#n and then, transmits the NP-eliminated stream.

Accordingly, the data rate of the NP-eliminated stream of each channel ch#n is decreased from the data rate of the input stream by an amount corresponding to the eliminated NP, and thus, the input stream of a high data rate can be transmitted by using a plurality of transmission lines each having a transmission band that is not relatively broad.

In addition, as the FEC unit 33 performing the error correction coding of the NP-eliminated stream (a BB frame generated therefrom) of the channel ch#n, a circuit of which the processing speed is not relatively high can be employed.

<Example of Configuration of Reception Device 12>

Figure 4:
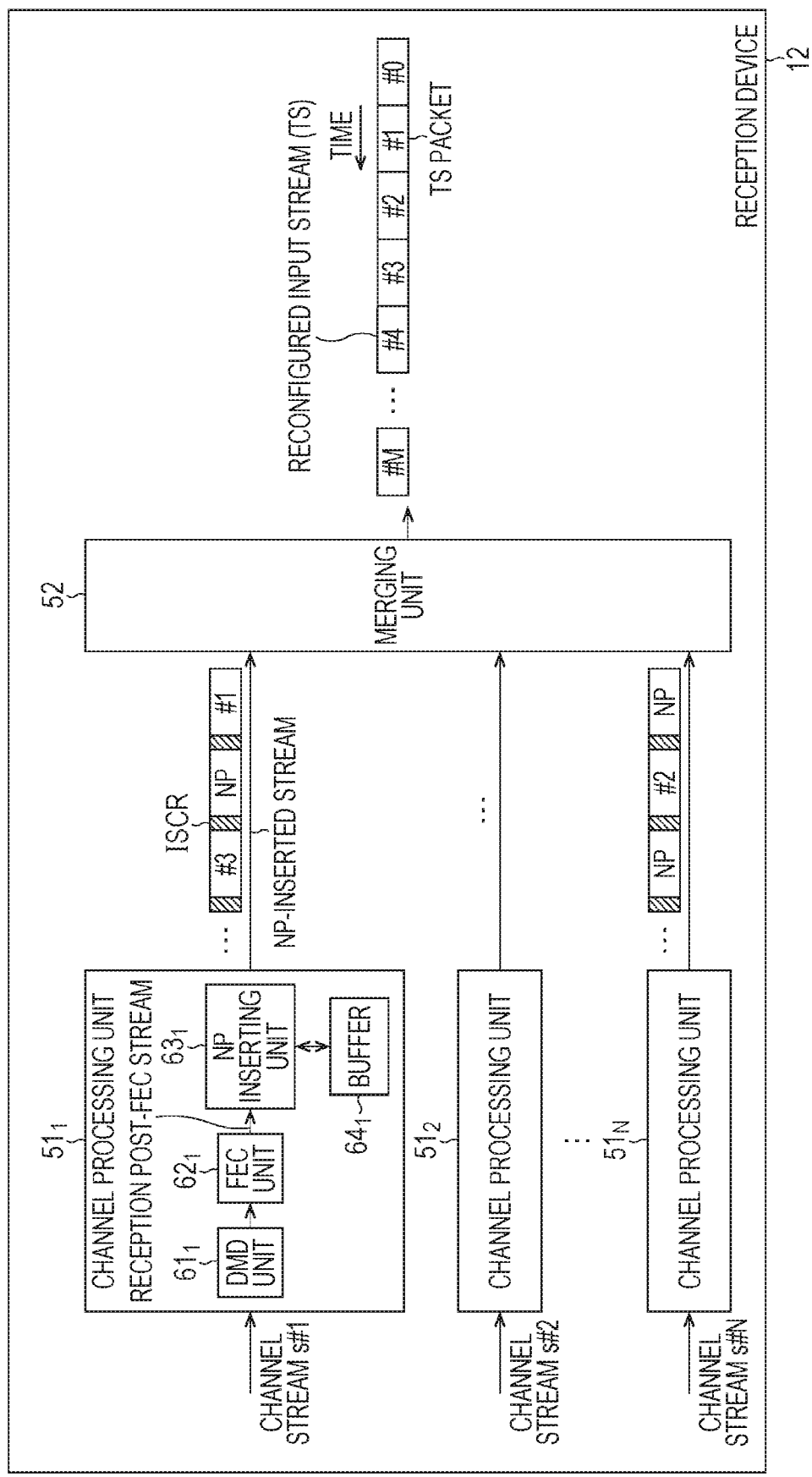
FIG. 4 is a block diagram that illustrates an example of the configuration of a reception device 12.

FIG. 4 is a block diagram that illustrates an example of the configuration of the reception device 12 illustrated in FIG. 1.

As illustrated in FIG. 4, the reception device 12 includes: N channel processing units $51_1$ to $51_N$; and a merging unit 52.

The channel processing unit $51_n$ receives and processes a channel stream s#n of the channel ch#n transmitted from the transmission device 11.

In other words, the channel processing unit 51 includes: a de-modulation (DMD) unit $61_n$; an FEC unit $62_n$; a NP inserting unit $63_n$, and a buffer $64_n$.

The DMD unit $61_n$ receives a channel stream s#n of a channel ch#n transmitted from the transmission device 11 and performs demodulation, which corresponds to the modulation performed by the MOD unit $34_n$ illustrated in FIG. 2, of the channel stream s#n of the channel ch#n. Then, the DMD unit $61_n$ supplies a demodulated signal of the channel ch#n acquired as a result of the demodulation to the FEC unit $62_n$.

The FEC unit $62_n$ restores a NP-eliminated stream that is in the form of a BB frame acquired by the FEC unit $33_n$ illustrated in FIG. 2 by performing decoding of an error correction code as an error correction corresponding to the error correction coding performed by the FEC unit $33_n$ illustrated in FIG. 2 for the demodulated signal of the channel ch#n supplied from the DMD unit $61_n$ and supplies the restored NP-eliminated stream to the NP inserting unit $63_n$ as a reception post-FEC stream of the channel ch#n.

The NP insert ing unit $63_n$ supplies the reception post-FEC stream of the channel ch#n supplied from the FEC unit $62_n$, to the buffer $64_n$ so as to be stored therein.

Then, the NP inserting unit $63_n$ outputs a packet of the reception post-FEC stream stored in the buffer $64_n$ or a NP as is necessary, thereby appropriately inserting a NP into the reception post-FEC stream, in other words, the NP-eliminated stream (in the form of a BB frame).

Accordingly, the NP inserting unit $63_n$ restores a stream of the channel ch#n after synchronization supplied from the synchronization unit $31_n$; illustrated in FIG. 2 to the NP eliminating unit 32 and supplies the restored stream after synchronization to the merging unit 52 as a NP-inserted stream of the channel ch#n.

Here, since the NP-inserted stream of the channel ch#n is a stream acquired by restoring the stream of the channel ch#n after synchronization supplied from the synchronization unit $31_n$ to the NP eliminating unit 32, an ISCR is added to the end of the packet of the NP-inserted stream of the channel ch#n.

The buffer $64_n$, under the control of the NP inserting unit $63_n$, temporarily stores packets of the reception post-FEC stream of the channel ch#n supplied from the NP inserting unit $63_n$ and reads the stored packets.

The merging unit 52, based on the ISCRs added to the ends of packets of the NP-inserted streams of the channels ch#1 to ch#N supplied from the NP inserting units $63_1$ to $63_N$ of the channel processing units $51_1$ to $51_N$, reconfigures an input stream configured by a plurality of TS packets . . . , #0, #1, . . . by aligning packets other than the NPs inserted by the NP inserting units $63_1$ to $63_N$ among packets of the NP-inserted streams of the channels ch#1 to ch#N in order of the transmission time represented by the ISCRs and outputs the reconfigured input stream.

<Reception Process>

Figure 5:
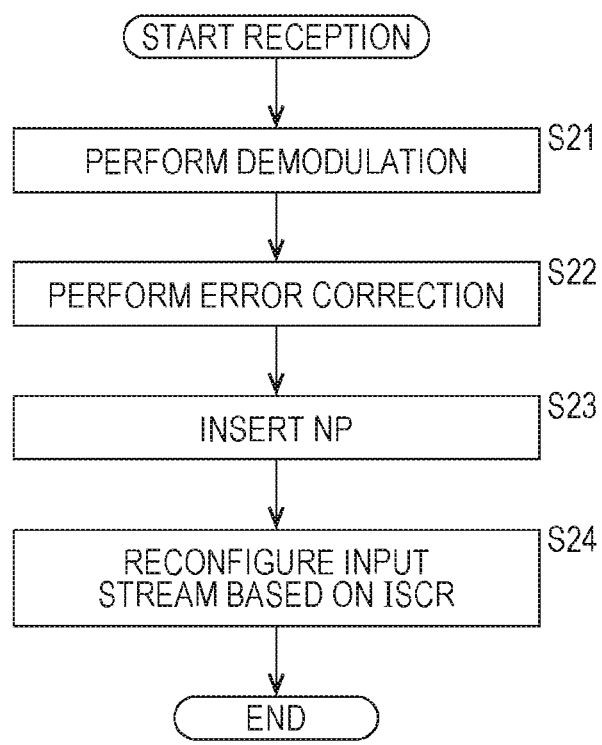
FIG. 5 is a flowchart that illustrates an example of the process (reception process) of the reception device 12.

FIG. 5 is a flowchart that illustrates an example of the process (reception process) of the reception device 12 illustrated in FIG. 4.

In step S21, the DMD unit $61_n$ of the channel processing unit $51_n$ receives and demodulates a channel stream s#n of a channel ch#n transmitted from the transmission device 11 and supplies a demodulated signal of the channel ch#n acquired as a result of the demodulation to the FEC unit $62_n$, and the process proceeds to step 22.

In step S22, the FEC unit 62$_n$ restores a NP-eliminated stream that is in the form of a BB frame by performing an error correction of the demodulated signal of the channel ch#n supplied from the DMD unit 61$_n$ and supplies the restored NP-eliminated stream to the NP inserting unit 63$_n$ as a reception post-FEC stream of the channel ch#n, and the process proceeds to step S23.

In step S23, the NP inserting unit 63$_n$ supplies the reception post-FEC stream of the channel ch#n supplied from the FEC unit 62$_n$, to the buffer 64$_n$ so as to be stored therein. In addition, the NP inserting unit 63$_n$: restores a stream of the channel ch#n after synchronization that is in a form acquired by appropriately inserting a NP into the reception post-FEC stream (a NP-eliminated stream (in the form of a BB frame)) by outputting a packet of the reception post-FEC stream stored in the buffer 64$_n$ or a NP and supplies the restored stream after synchronization to the merging unit 52 as a NP-inserted stream of the channel ch#n.

Then, the process proceeds from step S23 to step S24, and the merging unit 52, based on ISCRs added to the ends of packets of the NP-inserted streams of the channels ch#1 to ch#N supplied from the NP inserting units 63$_1$ to 63$_N$, reconfigures and outputs an input stream configured by a plurality of TS packets . . . , #0, #1, . . . and the process ends.

The process of steps S21 to S24 illustrated in FIG. 5 is performed in a pipeline manner.

<Stream Handled by Transmission System>

Figure 6:
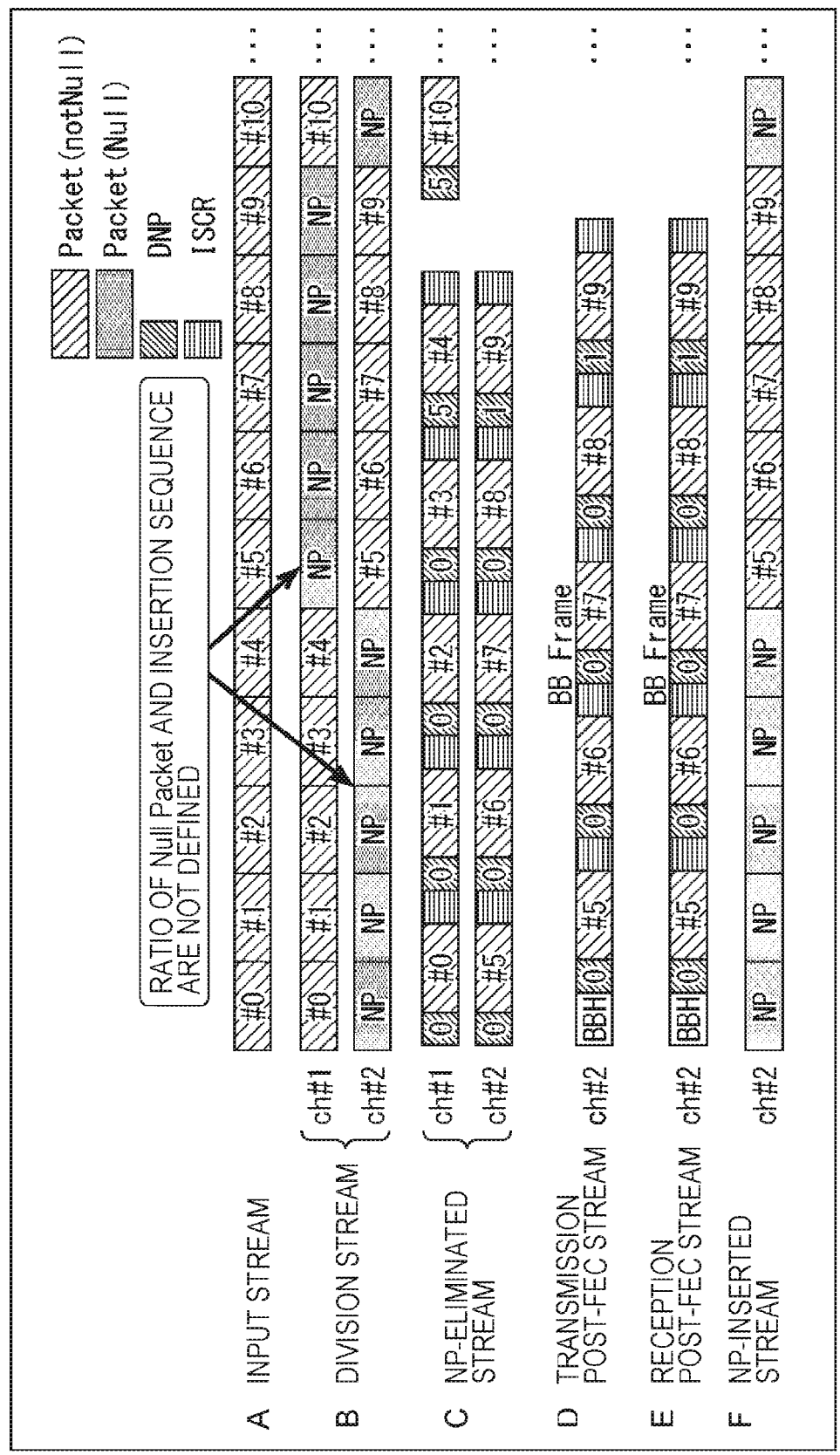
FIG. 6 is a diagram that illustrates an example of a stream handled by a transmission system.

FIG. 6 is a diagram that illustrates an example of a stream handled by the transmission system illustrated in FIG. 1.

In the example illustrated in FIG. 6, two is employed as the number N of channels.

A of FIG. 6 illustrates an example of an input stream supplied to the splitter 21 of the transmission device 11 (FIG. 2).

The input stream is configured by a plurality of TS packets . . . , #0, #1, . . . .

B of FIG. 6 illustrates an example of division streams supplied from the splitter 21 of the transmission device 11 (FIG. 2) to the synchronization unit 31$_n$ through the buffer 22$_n$.

The splitter 21 distributes each TS packet of the input stream illustrated in A of FIG. 6 to one of two channels ch#1 and ch#2 and distributes NPs to the other channel, thereby dividing the input stream into division streams of the two channels ch#1 and ch#2.

In B of FIG. 6, the splitter 21, for example, continuously distributes TS packets #0 to #4 of the input stream illustrated in A of FIG. 6 to the channel ch#1 and continuously distributes five NPs to the channel ch#2, thereafter, continuously distributes TS packets #5 to #9 of the input stream to the channel ch#2 and continuously distributes five NPs to the channel ch#1, and thereafter, similarly, distributes a TS packet of the input stream to one of the two channels ch#1 and ch#2 and distributes a NP to the other channel, whereby the input stream is divided into division streams of the two channels ch#1 and ch#2.

C of FIG. 6 illustrates an example of a NP-eliminated stream supplied from the NP eliminating unit 32$_n$ of the transmission device 11 (FIG. 2) to the FEC unit 33$_n$.

The division stream of the channel ch#n acquired by the splitter 21 is regarded by the synchronization unit 31$_n$ as a stream of the channel ch#n after synchronization by adding an ISCR to the end of each packet of the division stream of the channel ch#n.

Then, the stream of the channel ch#n after synchronization is regarded as a NP-eliminated stream of the channel ch#n by eliminating NPs using the NP eliminating unit 32$_n$.

Here, in a case where a NP-eliminated stream of the channel ch#n is formed by eliminating a NP from the stream of the channel ch#n after synchronization, to the start of each packet of the NP-eliminated stream of the channel ch#n, the NP eliminating unit 32$_n$ adds a deleted null packets (DNP), for example, of one byte representing the number of NPs eliminated from between the packet and the next packet.

C of FIG. 6 illustrates NP-eliminated streams of the channels ch#1 and ch#2 that are acquired from the division streams of the channels ch#1 and ch#2 illustrated in B of FIG. 6.

The NP-eliminated stream of each of the channels ch#1 and ch#2 is a stream acquired by adding an ISCR to the end of each packet of the division stream of each of the channels ch#1 and ch#2 illustrated in B of FIG. 6, then eliminating each NP together with an ISCR added to the NP, and adding a DNP to the start of each packet (each packet remaining after the elimination of NPs).

Here, for example, between packets #0 and #1 of the division stream of the channel ch#1, since there is no NP eliminated by the NP eliminating unit 32$_n$ (the number of eliminated NPs is zero), a DNP disposed at the start of the packet #0 is set to zero.

In addition, for example, between packets #4 and #10 of the division stream of the channel ch#1, since there are five NPs eliminated by the NP eliminating unit 32$_n$, a DNP disposed at the start of the packet #4 is set to five.

D of FIG. 6 illustrates an example of a transmission post-FEC stream of the channel ch#2 acquired from the NP-eliminated stream of the channel ch#2 illustrated in C of FIG. 6 by the FEC unit 33$_2$ of the transmission device 11 (FIG. 2).

The transmission post-FEC stream of the channel ch#2 is a stream of a BB frame to which a BB header is added in a data field by using one or more packets (including an ISCR and a DNP added to each of the packets) of the NP-eliminated stream of the channel ch#2 illustrated in C of FIG. 6 as the data field (payload). In D of FIG. 6, packets #5 to #9 are arranged in a data field of a BE frame of one frame.

In addition, at the end of the BB frame, while in-band signaling (or padding) is added as is necessary, in FIG. 6, the in-band signaling is not illustrated.

E of FIG. 6 illustrates an example of the reception post-FEC stream of the channel ch#2 supplied from the FEC unit 62$_2$ of the reception device 12 (FIG. 4) to the NP inserting unit 63$_2$.

As illustrated in FIG. 4, the FEC unit 62$_2$ restores a NP-eliminated stream that is in the form of a BB frame acquired by the FEC unit 33$_2$ illustrated in FIG. 2 and supplies the restored NP-eliminated stream to the NP inserting unit 63$_2$ as a reception post-FEC stream of the channel ch#2.

Accordingly, the reception post-FEC stream of the channel ch#2 is a stream similar to the NP-eliminated stream of the channel ch#2 that is in the form of a BB frame, in other words, the transmission post-FEC stream of the channel ch#2 illustrated in D of FIG. 6.

F of FIG. 6 illustrates an example of the NP-inserted stream of the channel ch#2 supplied from the NP inserting unit 63$_2$ of the reception device 12 (FIG. 4) to the merging unit 52.

The NP-inserted stream of the channel ch#2 illustrated in F of FIG. 6 is a stream acquired by inserting NPs corresponding to the number represented by the DNP included in the reception post-FEC stream of the channel ch#2 into packets (row) included in the BB frame of the reception post-FEC stream of the channel ch#2 illustrated in E of FIG. 6.

Here, in the NP-inserted stream of the channel ch#2 illustrated in F of FIG. 6, five NPs are inserted before the first packet #5 of the BB frame of the reception post-FEC stream of the channel ch#2 illustrated in E of FIG. 6. The DNP representing the insertion of five NPs is added to the start of the last packet of a BB frame, which is not illustrated in the drawing, just prior to the BB frame of the reception post-FEC stream of the channel ch#2 illustrated in E of FIG. 6.

The DNP included in the reception post-FEC stream of the channel ch#2 illustrated in E of FIG. 6 is eliminated when the reception post-FEC stream of the channel ch#2 illustrated in E of FIG. 6 is formed as the NP-inserted stream of the channel ch#2 illustrated in F of FIG. 6 by the NP inserting unit $63_2$.

In addition, the NP-inserted stream of the channel ch#2 illustrated in F of FIG. 6, as described with reference to FIG. 4, is a stream acquired by restoring the stream of the channel ch#2 after synchronization supplied from the synchronization unit $31_n$ illustrated in FIG. 2 to the NP eliminating unit 32. Thus, while an ISCR is added to the end of the packet of the NP-inserted stream of the channel ch#2 illustrated in F of FIG. 6, the ISCR is not illustrated in F of FIG. 6.

Meanwhile, the NP-eliminated stream of the channel ch#n (n=1, 2 in FIG. 6) illustrated in C of FIG. 6 is a stream in which, after an ISCR is added to the end of each packet of the division stream of the channel ch#n illustrated in B of FIG. 6, each NP is eliminated together with the ISCR added to the NP, and a DNP is added to the start of each packet.

In a case where NPs are eliminated from the stream of the channel ch#n after synchronization by the NP eliminating unit $32_n$ of the transmission device 11, as described above, when the ISCR added to each of the NPs is eliminated, it is difficult for the NP inserting unit $63_n$ of the reception device 12 to restore the stream of the channel ch#n after synchronization acquired by the synchronization unit $31_n$ illustrated in FIG. 2 as a NP-inserted stream of the channel ch#n.

In other words, while an ISCR is added to the end of each packet in the stream of the channel ch#n after synchronization acquired by the synchronization unit $31_n$ of the transmission device 11, in a case where, together with each NP, an ISCR added to the NP is eliminated from the stream of the channel ch#n after synchronization by the NP eliminating unit $32_n$, by inserting NPs based on the DNP using the NP inserting unit $63_n$ of the reception device 12, NPs eliminated by the NP eliminating unit $32_n$ can be restored, but it is difficult to restore the ISCR eliminated together with each NP by using the NP eliminating unit $32_n$.

As a method of restoring an ISCR eliminated by the NP eliminating unit $32_n$ together with a NP, for example, there is a method in which an ISCR added to a NP inserted by the NP inserting unit $63_n$ is restored by being predicted through interpolation or the like based on ISCRs added to packets before and after the insertion of the NPs that is performed by the NP inserting unit $63_n$.

However, also in such a case, it cannot be determined that ISCRs eliminated by the NP eliminating unit $32_n$ together with NPs are correctly restored.

Thus, in a case where NPs are eliminated from the stream of the channel ch#n after synchronization by the NP eliminating unit $32_n$ of the transmission device 11, ISCRs added to the NPs can be configured to remain as they are without being eliminated.

In this way, the NP inserting unit $63_n$ of the reception device 12 can accurately restore the stream of the channel ch#n after synchronization acquired by the synchronization unit $31_n$ illustrated in FIG. 2, in other words, a stream in which an ISCR added by the synchronization unit $31_n$ illustrated in FIG. 2 is added to each packet of the division stream of the channel ch#n as a NP-inserted stream of the channel ch#n.

Figure 7:
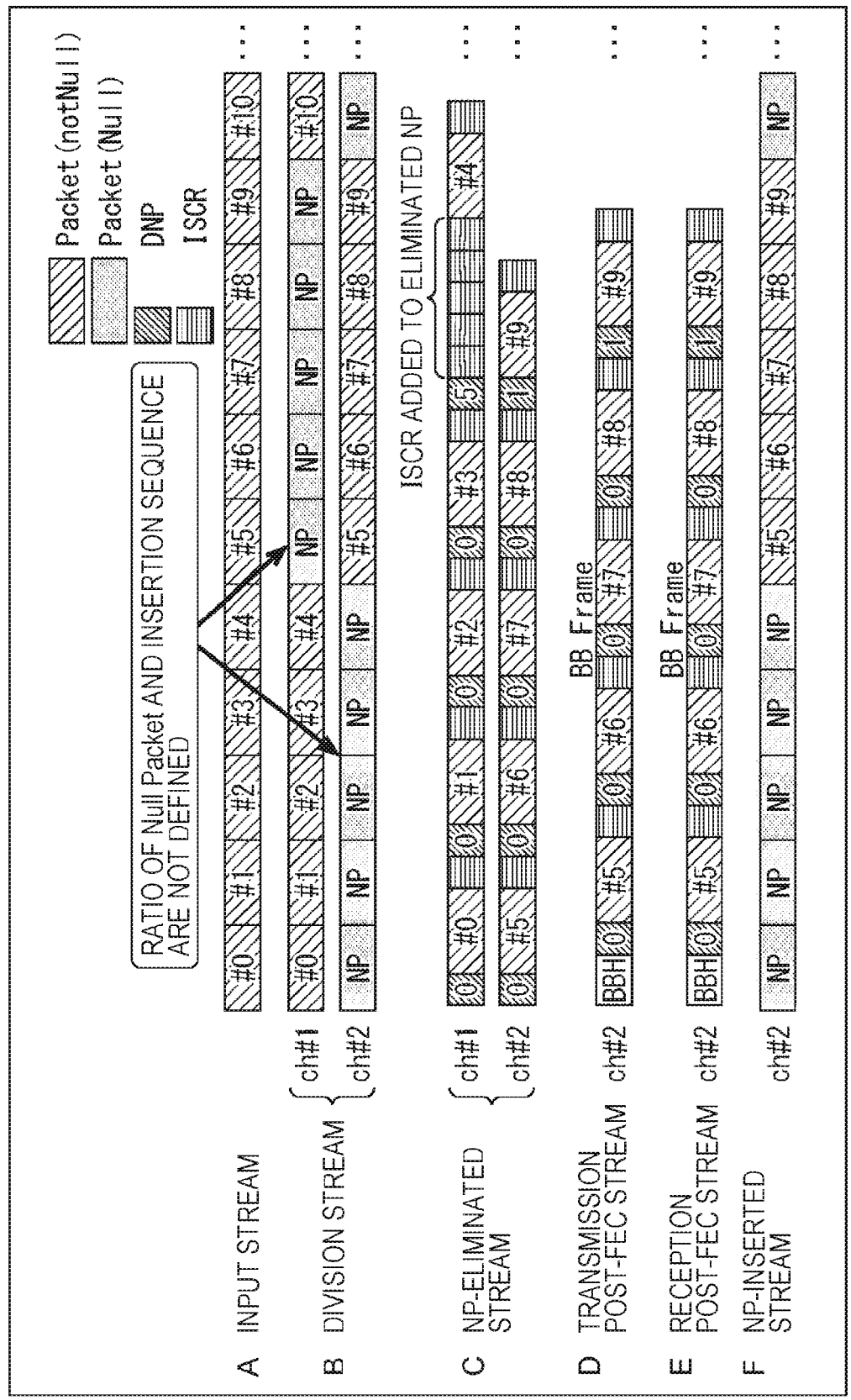
FIG. 7 is a diagram that illustrates an example of a stream handled by a transmission system.

FIG. 7 is a diagram that illustrates an example of a stream, which is handled by the transmission system illustrated in FIG. 1, of a case where an ISCR added to a NP is configured to remain as it is without being eliminated in a case where the NP is eliminated from a stream of the channel ch#n after synchronization by the NP eliminating unit $32_n$ of the transmission device 11.

In the example illustrated in FIG. 7, similarly to the example illustrated in FIG. 6, two is employed as the number N of channels.

Since A of FIG. 7, B of FIG. 7, and D of FIG. 7 to F of FIG. 7 are diagrams that are respectively similar to A of FIG. 6, B of FIG. 6, and D of FIG. 6 to F of FIG. 6, description thereof will not be presented here.

C of FIG. 7 illustrates NP-eliminated streams of the channels ch#1 and ch#2 acquired from the division streams of the channels ch#1 and ch#2 illustrated in B of FIG. 7.

As illustrated in C of FIG. 7, the NP-eliminated stream of the channel ch#1 is a stream in which, after an ISCR is added to the end of each packet of the division stream of the channel ch#1 illustrated in B of FIG. 7, each NP is eliminated in a form allowing the ISCR added to the NP to remain, and a DNP is added to the start of each packet.

As described above, by eliminating each NP in the form allowing an ISCR added to the NP to remain, in the NP-eliminated stream of the channel ch#1 illustrated in C of FIG. 7, an ISCR added to each NP is present in a form not being added to the end of a packet.

<Restoration of Stream of Channel Ch#n after Synchronization that is Performed by NP Inserting Unit $63_n$>

Figure 8:
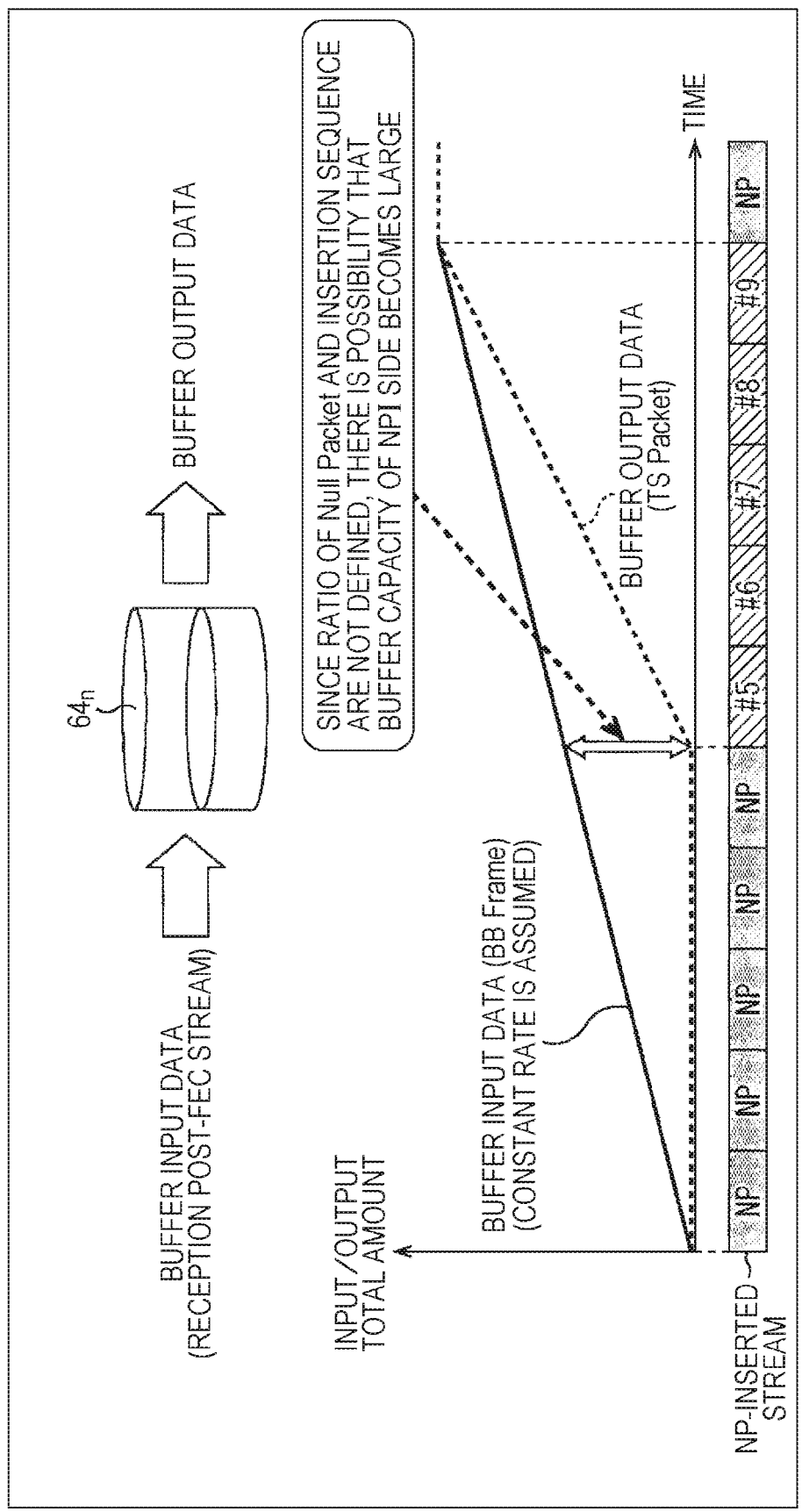
FIG. 8 is a diagram that illustrates the restoration of a stream of a channel ch#n after synchronization, which is performed by a NP inserting unit $63_n$ of the reception device 12, as a NP-inserted stream of the channel ch#n.

FIG. 8 is a diagram that illustrates the restoration of a stream of a channel ch#n after synchronization, which is performed by the NP inserting unit $63_n$ of the reception device 12 (FIG. 4), as a NP-inserted stream of the channel ch#n.

As described with reference to FIG. 4, the NP inserting unit $63_n$ supplies a reception post-FEC stream of the channel ch#n supplied from the FEC unit $62_n$ to the buffer 64 so as to be stored therein and outputs packets of the reception post-FEC stream stored in the buffer $64_n$ or NPs, thereby appropriately inserting the NPs into the reception post-FEC stream (a NP-eliminated stream (in the form of a BB frame)). In this way, the NP inserting unit $63_n$ restores the stream of the channel ch#n after synchronization as a NP-inserted stream of the channel ch#n.

In other words, here, the NP inserting unit $63_n$ sets, among packets of the reception post-FEC stream of the channel ch#n supplied from the FEC unit $62_n$, which have been written (stored) into the buffer $64_n$, an oldest packet that has not been read from the buffer $64_n$ as a focus packet to be focused on.

The NP inserting unit $63_n$ inserts NPs into the reception post-FEC stream of the channel ch#n supplied from the FEC unit $62_n$ by outputting the NPs corresponding to the number represented by a DNP added to the focus packet and thereafter outputting the focus packet, thereby restoring the stream of the channel ch#n after synchronization as a NP-inserted stream of the channel ch#n.

Accordingly, each packet of the reception post-FEC stream of the channel ch#n written into the buffer $64_n$ needs to be stored in the buffer $64_n$ until the packet becomes the focus packet and then the output of NPs corresponding to the number represented by a DNP added to the focus packet ends.

Here, data that is input (supplied) and written to the buffer $64_n$ will be referred to also as buffer input data, and data that is read and output from the buffer $64_n$ will be also referred to as buffer output data.

FIG. 8 illustrates an example of changes in a total amount of the buffer input data and a total amount of the buffer output data with respect to time.

The buffer input data is the reception post-FEC stream of the channel ch#n. Here, for simplification of description, it is assumed that the data rate of the buffer input data is constant.

In such a case, the total amount of the buffer input data, as illustrated by a solid line in FIG. 8, increases at a constant inclination.

On the other hand, the total amount of the buffer output data is changed, as illustrated by a dotted line in FIG. 8, in accordance with NPs inserted into the reception post-FEC stream of the channel ch#n when the stream of the channel ch#n after synchronization is restored as a NP-inserted stream of the channel ch#n.

In other words, as described above, while the NP inserting unit $63_n$ outputs a packet of the reception post-FEC stream as the buffer input data stored in the buffer $64_n$ or a NP, in a case where a packet of the reception post-FEC stream stored in the buffer $64_n$ is output, the packet of the reception post-FEC stream is read from the buffer $64_n$, and accordingly, the total amount of the buffer output data increases.

However, in a case where the NP inserting unit $63_n$ outputs a NP, a packet of the reception post-FEC stream is not read from the buffer $64_n$, and accordingly, the total amount of the buffer output data does not change (does not increase).

Thus, in a case where many NPs are continuously inserted by the NP inserting unit $63_n$ in the stream of the channel ch#n after synchronization restored as a NP-inserted stream of the channel ch#n, and furthermore, the division stream of the channel ch#n acquired by the splitter 21 of the transmission device 11 (FIG. 2), during a period in which the many NPs are continuous, the NP inserting unit $63_n$ continuously outputs the NPs, and a packet of the reception post-FEC stream is not read from the buffer $64_n$, and accordingly, the total amount of the buffer output data does not change.

Since the total amount of the buffer input data increases at a constant inclination as described above, in a case where the total amount of the buffer output data does not change, a difference (hereinafter, referred to as a total amount difference) between the total amount of the buffer input data and the total amount of the buffer output data increases.

Since the total amount difference is a data amount of data stored in the buffer $64_n$, a maximum total amount difference is a buffer amount that is required for the buffer $64_n$.

As described above, during the period in which NPs are continuous in the division stream of the channel ch#n acquired by the splitter 21, the total amount of the buffer output data does not change, and accordingly, the total amount difference increases.

Accordingly, in the splitter 21, in a case where a NP insertion method (for example, the ratio of NPs inserted into each channel, whether a NP is inserted into each channel in that order, or the like) for inserting NPs into the division stream of the channel ch#n is not regulated (defined), and free insertion of NPs is permitted, a buffer having a large buffer amount is required as the buffer $64_n$ of the reception device 12, and the cost of the reception device 12 increases in some cases.

In addition, in a case where the buffer amount of the buffer $64_n$ of the reception device 12 is less than the total amount difference, there is a concern that the buffer $64_n$ is overflown, and the reception post-FEC stream of the channel ch#n supplied from the FEC unit $62_n$ cannot be appropriately processed (the stream of the channel ch#n after synchronization cannot be restored as a NP-inserted stream of the channel ch#n) by the NP inserting unit $63_n$.

Thus, for the transmission system illustrated in FIG. 1, the NP insertion method is defined such that an input stream is divided by the splitter 21 into division streams of the channels ch#1 to ch#N in which packets of the input stream are included at a predetermined constant density.

According to such a NP insertion method, among the division streams of the channels ch#1 to ch#N, NPs are inserted so as to be balanced, in other words, so as to be smoothed.

As a result, as many NPs are continuously inserted into the division stream of the channel ch#n, as described above, it can be prevented that a buffer having a large buffer amount is necessary as the buffer $64_n$ of the reception device 12.

In addition, the data rate of the NP-eliminated stream of the channel ch#n supplied to the FEC unit $33_n$ of the transmission device 11 is required to be a predetermined data rate of the processing speed (FEC rate) of the FEC unit $33_n$ or less. In a case where the data rate of the NP-eliminated stream of the channel ch#n exceeds the processing speed of the FEC unit $33_n$, it is difficult for the FEC unit $33_n$ to appropriately process the NP-eliminated stream of the channel ch#n.

Here, the data rate of the NP-eliminated stream of the channel ch#n supplied to the FEC unit $33_n$ of the transmission device 11 is throughput of the data field of the BB frame (data acquired by excluding the BB header of the BB frame) generated by the FEC unit $33_n$ and is determined based on the rate of symbols, the modulation system of the quadrature modulation performed by the MOD unit $34_n$, the error correction code employed by the FEC unit $33_n$, on/off of a pilot signal in the modulated signal acquired by the MOD unit $34_n$, and the like.

Here, in a case where the data rate of the NP-eliminated stream of the channel ch#n supplied to the FEC unit $33_n$ of the transmission device 11 is assumed to be determined as a predetermined data rate of the processing speed of the FEC unit $33_n$ or less in advance, the NP insertion method may be defined such that the ratio of NPs inserted to the channels ch#1 to ch#N is the same as the ratio of reciprocals of the data rates, which are determined in advance, of the NP-eliminated streams of the channels ch#1 to ch#N in the splitter 21.

According to such a NP insertion method, as many NPs are inserted to a certain channel ch#n', the number of NPs inserted to any other channel ch#n decreases. As a result, the data rate of the NP-eliminated stream of the channel ch#n is higher than the processing speed of the FEC unit $33_n$ of the channel ch#n, and it can be prevented that the FEC unit $33_n$ cannot appropriately process the NP-eliminated stream of the channel ch#n.

In other words, in the splitter 21, by defining the NP insertion method such that the ratio of NPs inserted to the channels ch#1 to ch#N is the same as the ratio of reciprocals of the data rates, which are determined in advance, of the NP-eliminated streams of the channels ch#1 to ch#N, the data rates of the NP-eliminated streams of the channels ch#11 to ch#N are predetermined data rates of the processing speeds of the FEC unit $33_n$, which are determined in advance for the channels ch#1 to ch#N, or less. Accordingly, the FEC unit $33_n$ can appropriately process the NP-eliminated stream of the channel ch#n.

Figure 9:
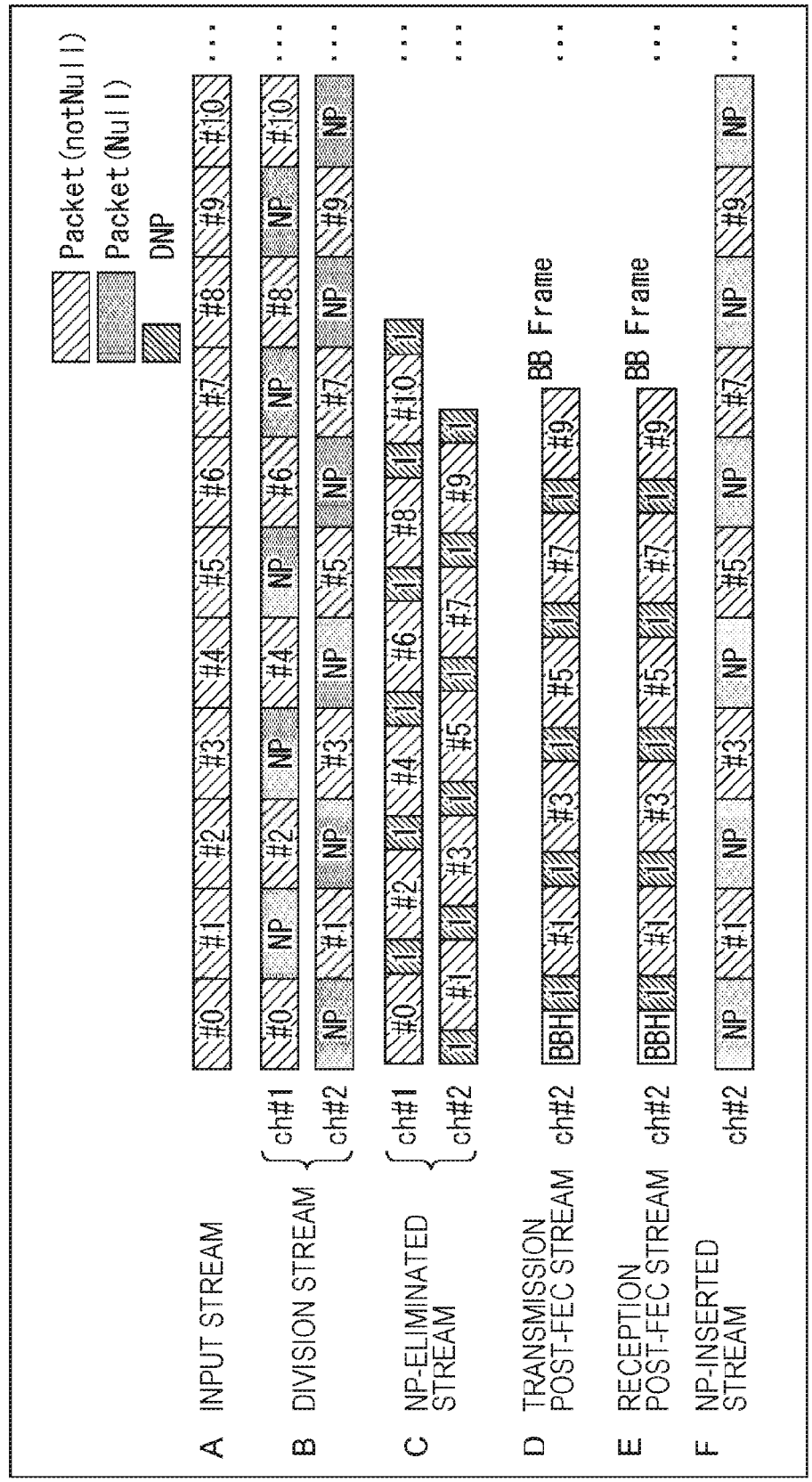
FIG. 9 is a diagram that illustrates an example of a stream handled by a transmission system in a case where a NP insertion method is employed.

FIG. 9 is a diagram that illustrates an example of a stream handled by the transmission system illustrated in FIG. 1 in a case where the NP insertion method as described above is employed.

In the example illustrated in FIG. 9, similarly to FIG. 6, two is employed as the number N of channels.

In FIG. 9, ISCRs are not illustrated.

A of FIG. 9 illustrates an example of an input stream supplied to the splitter 21 of the transmission device 11 (FIG. 2).

The input stream illustrated in A of FIG. 9 is configured similarly to A of FIG. 6.

B of FIG. 9 illustrates an example of division streams supplied from the splitter 21 of the transmission device 11 (FIG. 2) to the synchronization unit 31; through the buffer $22_n$.

The splitter 21 distributes each TS packet of the input stream illustrated in A of FIG. 9 to one of two channels ch#1 and ch#2 and distributes NPs to the other channel in accordance with a NP insertion method, thereby dividing the input stream into division streams of the two channels ch#1 and ch#2 such that packets of the input stream are included at a predetermined constant density.

In the example illustrated in B of FIG. 9, the ratio of reciprocals of data rates, which are determined in advance, of NP-eliminated streams of the channels ch#1 and ch#2, for example, is set as 1:1.

For this reason, the input stream is divided by the splitter 21 into division streams of the channels ch#1 and ch#2 in which NPs are inserted such that the ratio of NPs inserted into the channels ch#1 and ch#2 is 1:1.

In other words, in the example illustrated in B of FIG. 9, the input stream is divided into division streams of the channels ch#1 and ch#2 by the splitter 21 by distributing a TS packet #0 of the input stream to the channel ch#1 and distributing one NP to the channel ch#2, thereafter, distributing a TS packet #2 of the input stream to the channel ch#2 and distributing one NP to the channel ch#1, and thereafter, alternately distributing TS packets of the input stream to the channels ch#1 and ch#2 and alternately distributing NPs to the channels ch#2 and ch#1.

As a result, in any one of the division streams of the channels ch#1 and ch#2, packets of the input stream are included at a constant density (in the example illustrated in B of FIG. 9, the packets of the input stream are at a density of 0.5 packets per one packet of the division stream).

C of FIG. 9 illustrates an example of a NP-eliminated stream supplied from the NP eliminating unit $32_n$ of the transmission device 11 (FIG. 2) to the FEC unit $33_n$.

The division stream of the channel ch#n acquired by the splitter 21 is regarded by the synchronization unit $31_n$ as a stream of the channel ch#n after synchronization.

Then, the stream of the channel ch#n after synchronization is regarded as a NP-eliminated stream of the channel ch#n by eliminating NPs and inserting DNPs using the NP eliminating unit $32_n$.

C of FIG. 9 illustrates NP-eliminated streams of the channels ch#1 and ch#2 that are acquired from the division streams of the channels ch#1 and ch#2 illustrated in B of FIG. 9.

D of FIG. 9 illustrates an example of a transmission post-FEC stream of the channel ch#2 acquired from the NP-eliminated stream of the channel ch#2 illustrated in C of FIG. 9 by the FEC unit $33_2$ of the transmission device 11 (FIG. 2).

The transmission post-FEC stream of the channel ch#2 is a stream of a BB frame in which a BB header is added to one or more packets of the NP-eliminated stream of the channel ch#2 illustrated in C of FIG. 9.

E of FIG. 9 illustrates an example of the reception post-FEC stream of the channel ch#2 supplied from the FEC unit $62_2$ of the reception device 12 (FIG. 4) to the NP inserting unit $63_2$.

As illustrated in FIG. 4, the FEC unit $62_2$ restores a NP-eliminated stream that is in the form of a BB frame acquired by the FEC unit $33_2$ illustrated in FIG. 2 and supplies the restored NP-eliminated stream to the NP inserting unit $63_2$ as a reception post-FEC stream of the channel ch#2.

Accordingly, the reception post-FEC stream of the channel ch#2 is a stream similar to the NP-eliminated stream of the channel ch#2 that is in the form of a BB frame, in other words, the transmission post-FEC stream of the channel ch#2 illustrated in D of FIG. 9.

F of FIG. 9 illustrates an example of the NP-inserted stream of the channel ch#2 supplied from the NP inserting unit $63_2$ of the reception device 12 (FIG. 4) to the merging unit 52.

The NP-inserted stream of the channel ch#2 illustrated in F of FIG. 9 is a stream acquired by inserting NPs corresponding to the number represented by the DNP included in the reception post-FEC stream of the channel ch#2 into packets (row) included in the BB frame of the reception post-FEC stream of the channel ch#2 illustrated in E of FIG. 9 and eliminating the DNP.

Figure 10:
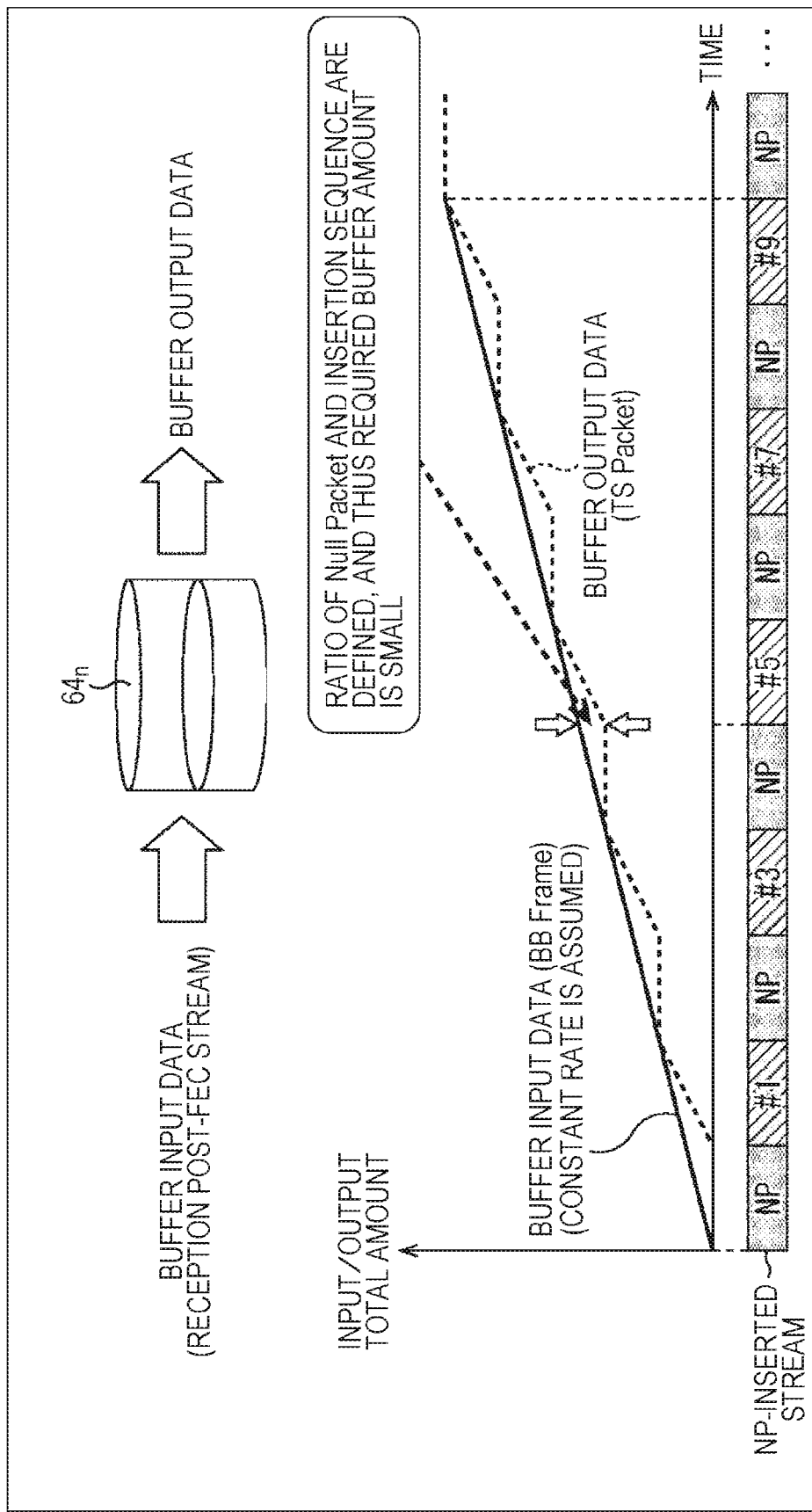
FIG. 10 is a diagram that illustrates an example of changes of a total amount of buffer input data and a total amount of a buffer output data with respect to time in a case where a NP insertion method is employed.

FIG. 10 is a diagram that illustrates an example of changes of a total amount of the buffer input data and a total amount of the buffer output data with respect to time in a case where the NP insertion method described above is employed in the splitter 21.

Also in the example illustrated in FIG. 10, similarly to the case illustrated in FIG. 8, the data rate of the buffer input data that is the reception post-FEC stream of the channel ch#n is assumed to be constant. In such a case, the total amount of the buffer input data, as illustrated by a solid line in FIG. 10, increases at a constant inclination.

Meanwhile, according to the NP insertion method, the input stream is divided into division streams of channels ch#1 to ch#N in which packets of the input stream are included at a predetermined constant density.

Accordingly, in the NP inserting unit $63_n$ of the reception device 12, in a stream of the channel ch#n after synchronization that is restored as a NP-inserted stream of the channel ch#n for the division stream of the channel ch#n, packets of the input stream are present at a constant density.

For this reason, in order for the NP inserting unit $63_n$ to restore the stream of the channel ch#n after synchronization as a NP-inserted stream of the channel ch#n, packets stored in the buffer $64_n$ are read at so-to-speak an average interval, and accordingly the total amount of the buffer output data, as illustrated by a dotted line in FIG. 10, increases at the average interval.

Accordingly, when the NP inserting unit $63_n$ restores the stream of the channel ch#n after synchronization as a NP-inserted stream of the channel ch#n, it can be prevented that a total amount difference between the total amount of the buffer input data and the total amount of the buffer output data is large according to continuous output of NPs and reading of no packet from the buffer $64_n$, and the buffer $64_n$ having a large buffer capacity is required.

FIG. 10 illustrates the total amount of the buffer output data of a case where, as illustrated in B of FIG. 9, the input stream is divided by the splitter 21 into division streams of channels ch#1 and ch#2 alternately including one of a NP and a packet of the input stream.

<Example of Configuration of Splitter 21>

Figure 11:
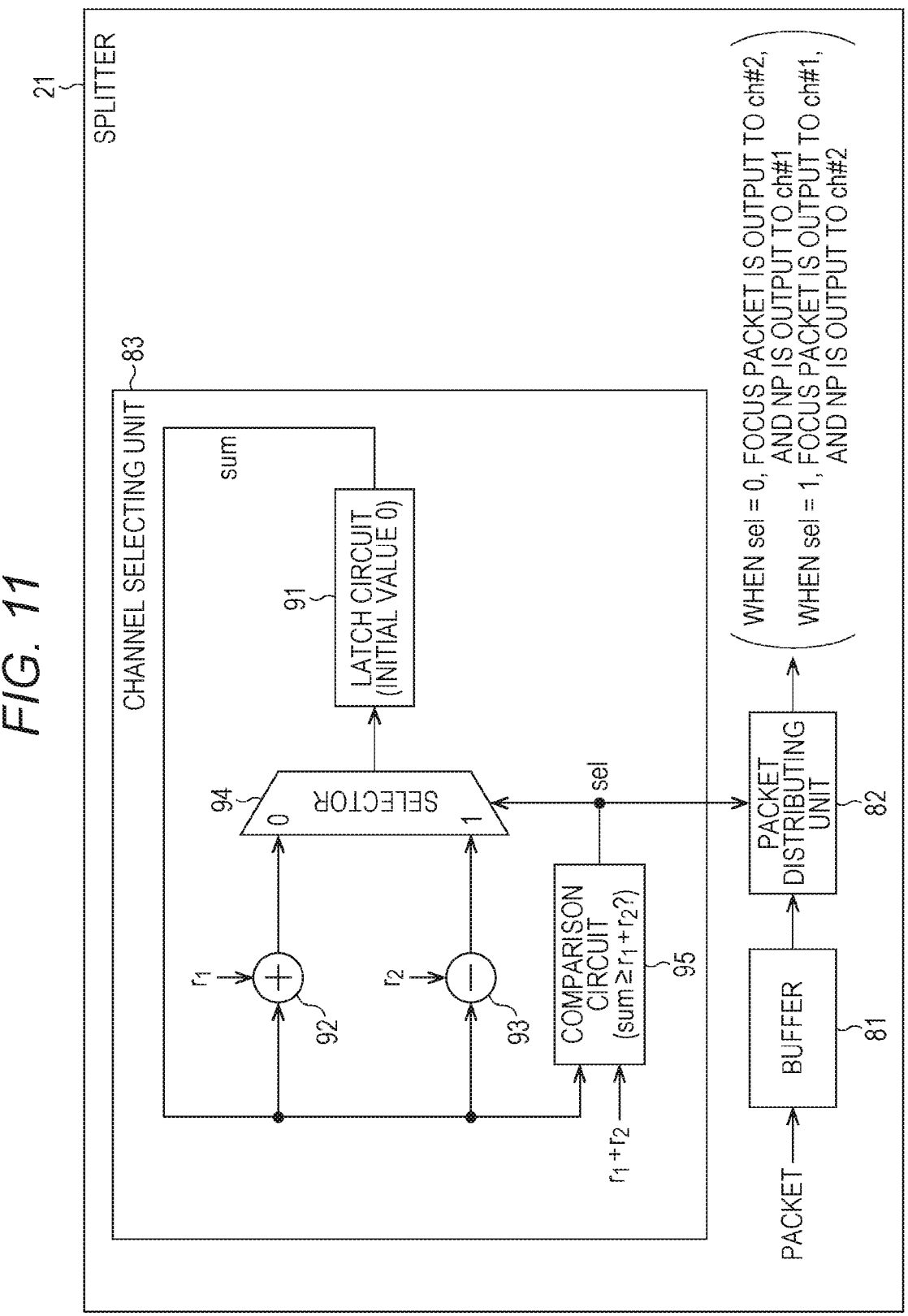
FIG. 11 is a block diagram that illustrates a first configuration example of a splitter 21.

FIG. 11 is a block diagram that illustrates a first configuration example of a splitter 21 dividing an input stream into division streams in accordance with the NP insertion method described above.

In other words, FIG. 11 illustrates an example of the configuration of the splitter 21 of a case where an input stream is divided into division streams of two channels ch#1 and ch#2.

In the example illustrated in FIG. 11, the splitter 21 includes: a buffer 81; a packet distributing unit 82; and a channel selecting unit 83.

Packets of the input stream are supplied to the buffer 81. The buffer 81 sequentially stores the packets of the input stream supplied thereto.

A selection signal sel used for selecting a channel to which a packet is distributed is supplied to the packet distributing unit 82 from the channel selecting unit 83.

The packet distributing unit 82 reads an oldest packet among packets stored in the buffer 81 as a focus packet to be focused on. In addition, the packet distributing unit 82 selects a channel to which the focus packet is distributed as a distribution channel in accordance with a selection signal sel supplied from the channel selecting unit 83 and distributes (outputs) the focus packet to the distribution channel.

In the example illustrated in FIG. 11, the packet distributing unit 82 selects one of two channels ch#1 and ch#2 as a distribution channel and distributes the focus packet to the distribution channel.

In addition, the packet distributing unit 82 distributes (outputs) NPs to the channel selected as the distribution channel.

The channel selecting unit 83 includes: a latch circuit 91; computing units 92 and 93; a selector 94; and a comparison circuit 95.

The channel selecting unit 83 generates a selection signal sel used for selecting a channel (distribution channel) to which the focus packet is distributed based on the data rate (hereinafter, simply referred to as the data rate of the channel ch#n) of the NP-eliminated stream of the channel ch#n that is determined in advance and supplies the generated selection signal to the packet distributing unit 82.

Here, the data rates of the channels ch#1 and ch#2 will be denoted as $r_1$ and $r_2$.

In the channel selecting unit 83, the latch circuit 91 latches a value "sum", which is supplied from the selector 94, having an initial value of "0" at timing synchronized with the packet of the input stream and supplies the latched value to the computing units 92 and 93 and the comparison circuit 95.

The computing unit 92 adds the value "sum" supplied from the latch circuit 91 and the data rate $r_1$ of the channel ch#1 together and supplies an addition value acquired as a result of the addition to the selector 94 as a new candidate of the value "sum"=sum+$r_1$.

The computing unit 93 adds the value "sum" supplied from the latch circuit 91 and the data rate $r_2$ of the channel ch#2 together and supplies an addition value acquired as a result of the addition to the selector 94 as a new candidate of the value "sum"=sum+$r_2$.

As described above, to the selector 94, the addition values are supplied from the computing units 92 and 93, and the selection signal sel is supplied from the comparison circuit 95.

Here, the selection signal sel takes a value of "0" or "1". The selection signal sel having a value of "0" represents that the channel ch#2 is selected as the distribution channel, and the selection signal sel having a value of "1" represents that the channel ch#1 is selected as the distribution channel.

The selector 94 selects the addition value supplied from the computing unit 92 or the addition value supplied from the computing unit 93 in accordance with the selection signal sel supplied from the comparison circuit 95 and supplies the selected addition value to the latch circuit 91.

The comparison circuit 95 compares the value "sum" supplied from the latch circuit 91 with an addition value "$r_1+r_2$" of the data rates of the channels ch#1 and ch#2. Then, the comparison circuit 95 outputs the selection signal sel having the value of "1" in a case where the value "sum" is the addition value "$r_1+r_2$" or more and outputs the selection signal sel having the value of "0" in a case where the value "sum" is less than the addition value "$r_1+r_2$".

The selection signal sel output by the comparison circuit 95 is supplied to the packet distributing unit 82 and the selector 94.

In the splitter 21 configured as above, the selection signal sel used for selecting the channel (distribution channel) to which the focus packet is distributed is generated by the channel selecting unit 83 based on the data rates $r_1$ and $r_2$ of the channels ch#1 and ch#2 such that the ratio of NPs inserted into the channels ch#1 and ch#2 is the same as the ratio of the reciprocals of the data rates $r_1$ and $r_2$ of the channels ch#1 and ch#2 and is supplied to the packet distributing unit 82.

In other words, the selection signal sel is generated by the channel selecting unit 83 such that the channel ch#1 is selected as the distribution channel every $(r_1+r_2)/r_1$ packets, and the channel ch#2 is selected as the distribution channel every $(r_1+r_2)/r_2$ packets.

The packet distributing unit 82 selects one of the channels ch#1 and ch#2 as the distribution channel in accordance with the selection signal sel supplied from the channel selecting unit 83 and distributes (outputs) the focus packet stored in the buffer 81 to the distribution channel and distributes (outputs) a NP to the other channel.

Figure 12:
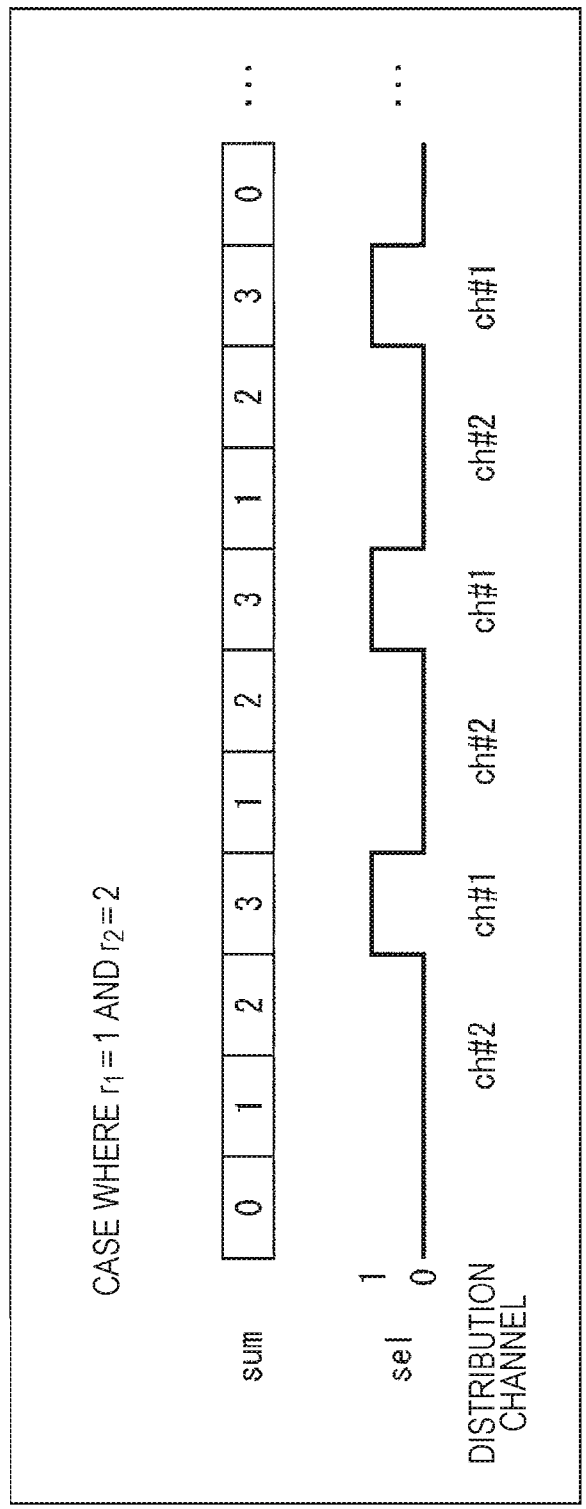
FIG. 12 is a diagram that illustrates the operation of the splitter 21.

FIG. 12 is a diagram illustrating the operation of the splitter 21 illustrated in FIG. 11 that is performed in a case where the data rates $r_1$ and $r_2$ are respectively "1" and "2".

In a case where the data rates $r_1$ and $r_2$ are respectively "1" and "2", the value "sum" changes as illustrated in FIG. 12, and, in a case where the value sum is $r_1+r_2=3$ or more, the selection signal sel becomes "1", and the channel ch#1 is selected as the distribution channel.

On the other hand, in a case where the value sum is $r_1+r_2=3$ or more, the selection signal sel becomes "0", and the channel ch#2 is selected as the distribution channel.

In the example illustrated in FIG. 12, the ratio (the ratio at which the channels ch#1 and ch#2 are not selected as the distribution channel) of NPs inserted into the channels ch#1 and ch#2 is the same as the ratio $1/r_1:1/r_2=1:1/2=2:1$ of the reciprocals of the data rates $r_1$ and $r_2$ of the channels ch#1 and ch#2.

In addition, in the example illustrated in FIG. 12, the selection signal sel is generated such that the channel ch#1 is selected as the distribution channel every $(r_1+r_2)/r_1=3$ packets (one packet with respect to three packets), and the channel ch#2 is selected as the distribution channel every $(r_1+r_2)/r_2=1.5$, in other words, every other packet or every two packets.

Figure 13:
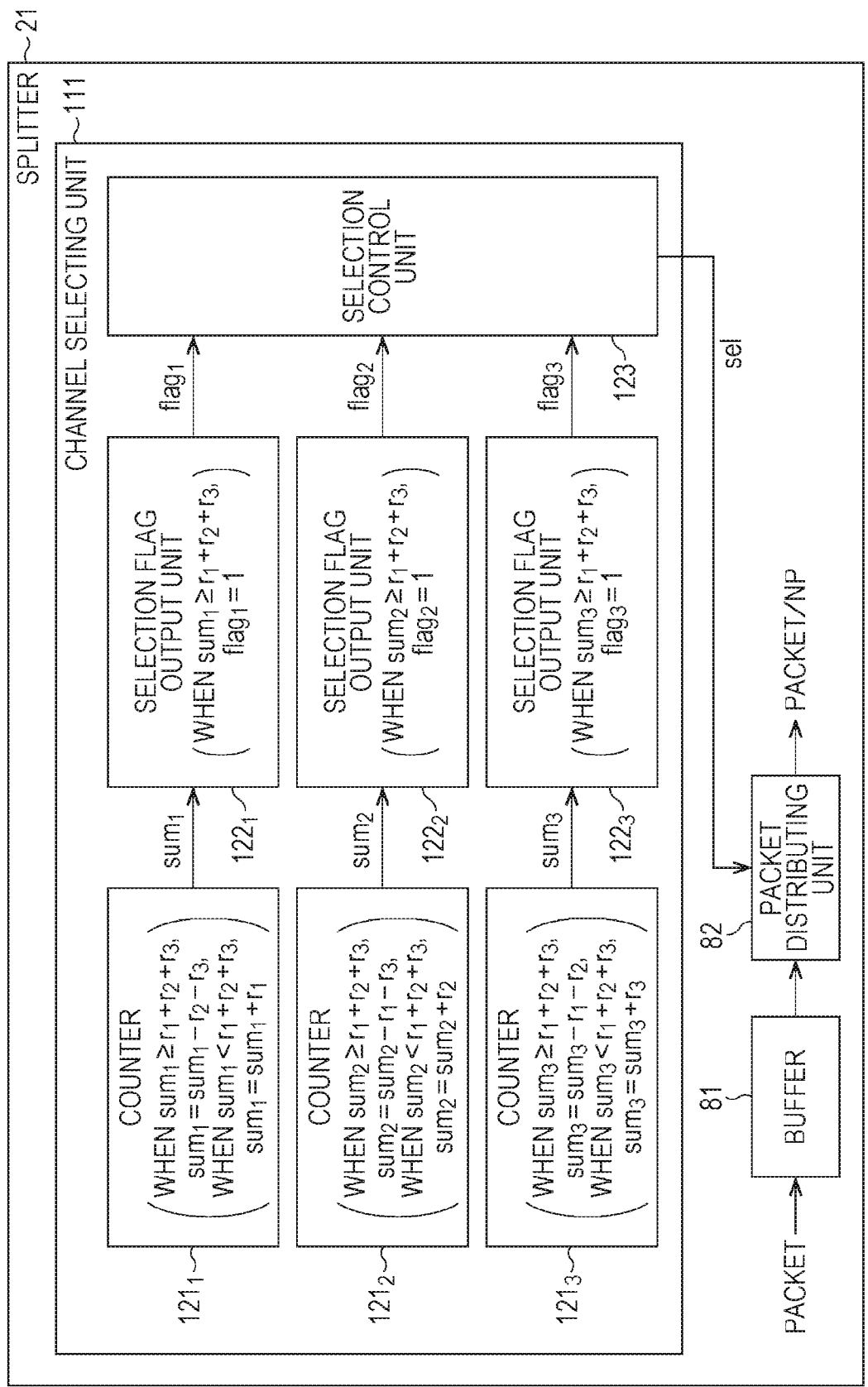
FIG. 13 is a block diagram that illustrates a second configuration example of the splitter 21.

FIG. 13 is a block diagram that illustrates a second configuration example of the splitter 21 dividing an input stream into division streams in accordance with the NP insertion method described above.

In other words, FIG. 13 illustrates an example of the configuration of the splitter 21 of a case where an input stream is divided into division streams of three channels ch#1 to ch#3

In the drawing, the same reference sign is assigned to a portion corresponding to that of the case illustrated in FIG. 11, and hereinafter, the description thereof will not be presented as is appropriate.

The splitter 21 illustrated in FIG. 13 includes a buffer 81 and a packet distributing unit 82, which is common to the case illustrated in FIG. 11.

However, the splitter 21 illustrated in FIG. 13 includes a channel selecting unit 111 instead of the channel selecting unit 83, which is different from that case illustrated in FIG. 11.

The channel selecting unit 111, similarly to the channel selecting unit 83 illustrated in FIG. 11, generates a selection signal sel used for selecting a channel to which a focus packet is distributed based on the data rates of the channels ch#1 to ch#3 and supplies the generated selection signal to the packet distributing unit 82.

However, the channel selecting unit 111 supplies a selection flag $flag_n$ representing whether or not the channel ch#n (n=1, 2, 3 in FIG. 13) is selected as the distribution channel to the packet distributing unit 82 as the selection signal sel.

The selection flag $flag_n$ takes a value of "0" or "1" The selection flag $flag_n$ having the value of "1" represents that the channel ch#n is selected (can be selected) as the distribution channel, and the selection flag $flag_n$ having the value of "0" represents that the channel ch#n is not selected as the distribution channel.

Here, the packet distributing unit 82 illustrated in FIG. 13 to which the selection flag $flag_n$ as described above is supplied as the selection signal sel, in a case where the selection flag $flag_n$ supplied as the selection signal sel is "1", selects a channel ch#n among the channels ch#1 to ch#3 as the distribution channel and distributes the focus packet to the channel ch#n that is the distribution channel.

In addition, the packet distributing unit 82 distributes NPs to all the channels that have not been selected as the distribution channel among the channels ch#1 to ch#3.

The channel selecting unit 83 includes: counters $121_1$ to $121_3$ and selection flag output units $122_1$ to $122_3$, which are respectively used for the channels ch#1 to ch#3 and a selection control unit 123.

Here, the data rates of the channels ch#1, ch#2, and ch#3 will be denoted as $r_1$, $r_2$, and $r_3$.

The counter $121_1$ counts a count value $sum_1$ at timing synchronized with the packet of the input stream and supplies the count value $sum_1$ to the selection flag output unit $122_1$.

In other words, in a case where the count value $sum_1$ is a value of "$r_1+r_2+r_3$" or more, the counter $121_1$ updates the count value $sum_1$ based on an equation "$sum_1=sum_1-r_2-r_3$" and supplies the updated count value to the selection flag output unit $122_1$.

In addition, in a case where the count value $sum_1$ is less than the value of "$r_1+r_2+r_3$", the counter $121_1$ updates the count value $sum_1$ based on an equation "$sum_1=sum_1+r_1$" and supplies the updated count value to the selection flag output unit $122_1$.

The counter $121_2$ counts a count value $sum_2$ at timing synchronized with the packet of the input stream and supplies the count value $sum_2$ to the selection flag output unit $122_2$.

In other words, in a case where the count value $sum_2$ is a value of "$r_1+r_2+r_3$" or more, the counter $121_2$ updates the count value $sum_2$ based on an equation "$sum_2=sum_2-r_1-r_3$" and supplies the updated count value to the selection flag output unit $122_2$.

In addition, in a case where the count value $sum_2$ is less than the value of "$r_1+r_2+r_3$", the counter $121_2$ updates the count value $sum_2$ based on an equation "$sum_2=sum_2+r_2$" and supplies the updated count value to the selection flag output unit $122_2$.

The counter $121_3$ counts a count value $sum_3$ at timing synchronized with the packet of the input stream and supplies the count value $sum_3$ to the selection flag output unit $122_3$.

In other words, in a case where the count value $sum_3$ is a value of "$r_1+r_2+r_3$" or more, the counter $121_3$ updates the count value $sum_3$ based on an equation "$sum_3=sum_3-r_1-r_2$" and supplies the updated count value to the selection flag output unit $122_3$.

In addition, in a case where the count value $sum_3$ is less than the value of "$r_1+r_2+r_3$", the counter $121_3$ updates the count value $sum_3$ based on an equation "$sum_3=sum_3+r_3$" and supplies the updated count value to the selection flag output unit $122_3$.

The selection flag output unit $122_n$ outputs the selection flag $flag_n$ having the value of "0" to the selection control unit 123 as a default value.

Then, in a case where the count value $sum_n$ supplied from a counter $121_n$ is the value of "$r_1+r_2+r_3$" or more, the selection flag output unit $122_n$ outputs the selection flag $flag_n$ having the value of "1" to the selection control unit 123.

The selection control unit 123 selects one of selection flags $flag_n$ of which the value is "1" among the selection flags $flag_1$ to $flag_3$ supplied from the selection flag output units $122_1$ to $122_3$ as the selection signal sel and supplies the selected selection flag to the packet distributing unit 82.

In addition, the selection control unit 123 performs control of the selection flag output unit $122_n$ such that the value of the selection flag $flag_n$ selected as the selection signal sel is reset to "0".

Here, when the selection control unit 123, for example, is assumed to select the selection flags $flag_1$, $flag_2$, and $flag_3$ as the selection signal sel in the described order with priority, in a case where the selection flag $flag_1$ is "1", the selection flag $flag_1$ is selected as the selection signal sel.

In addition, in a case where the selection flag $flag_1$ is "0", and the selection flag $flag_2$ is "1", the selection flag $flag_2$ is selected as the selection signal sel.

Furthermore, in a case where both the selection flags $flag_1$ and $flag_2$ are "0", and the selection flag $flag_3$ is "1", the selection flag $flag_3$ is selected as the selection signal sel.

In the splitter 21 configured as above, the selection signal sel used for selecting the distribution channel is generated by the channel selecting unit 111 based on the data rates $r_1$ to $r_3$ of the channels ch#1 to ch#3 such that the ratio of NPs inserted into the channels ch#1 to ch#3 is the same as the ratio of the reciprocals of the data rates $r_1$ to $r_3$ of the channels ch#1 to ch#3 and is supplied to the packet distributing unit 82.

In other words, the selection signal sel is generated by the channel selecting unit 111 such that the channel ch#1 is selected as the distribution channel every $(r_1+r_2+r_3)/r_1$ packets, the channel ch#2 is selected as the distribution channel every $(r_1+r_2+r_3)/r_2$ packets, and the channel ch#3 is selected as the distribution channel every $(r_1+r_2\ r_3)/r_3$ packets.

The packet distributing unit 82 selects one channel ch#n of the channels ch#1 to ch#3 as the distribution channel in accordance with the selection signal sel supplied from the channel selecting unit 111i and distributes (outputs) the focus packet stored in the buffer 81 to the distribution channel and distributes (outputs) NPs to the other two channels.

The configuration illustrated in FIG. 13 can be also applied to a splitter 21 of a case where the input stream is divided into division streams of two channels or a case where the input stream is divided into division streams of four or more channels.

<Process Performed in Case where NP is Included in Input Stream>

Figure 14:
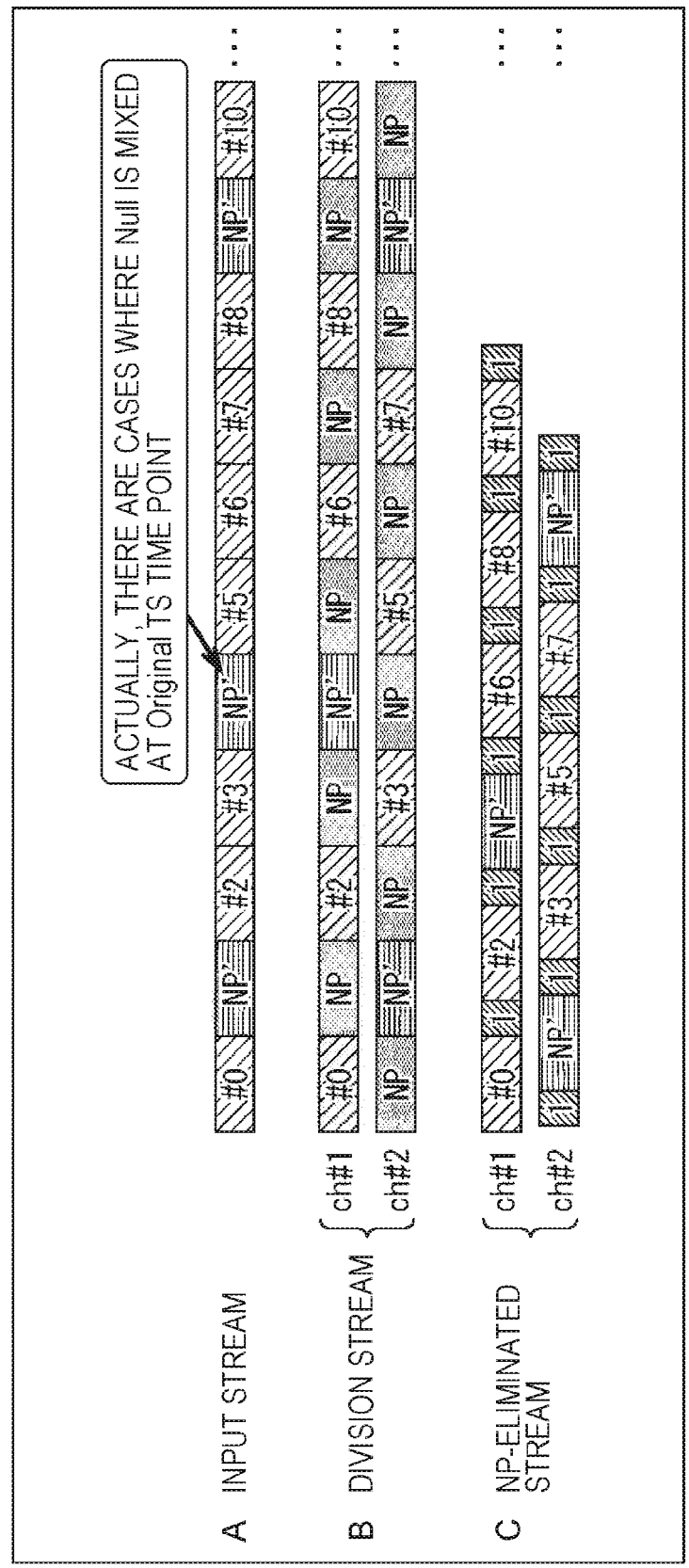
FIG. 14 is a diagram that illustrates an example of the process of the transmission device 11 for an input stream including NPs.

FIG. 14 is a diagram that illustrates an example of the process of the transmission device 11 for an input stream including NPs.

In other words, FIG. 14 illustrates an example of an input stream, division streams, and NP-eliminated streams.

In the example illustrated in FIG. 14, two is employed as the number N of channels, and ISCRs are not illustrated.

A of FIG. 14 illustrates an example of the input stream including NPs.

In FIG. 14, in order to discriminate a NP included in the input stream from a NP inserted into the division stream of the splitter 21, the NP included in the input stream is denoted as NP'.

B of FIG. 14 illustrates an example of division streams of two channels ch#1 and ch#2 generated by the splitter 21 for the input stream illustrated in A of FIG. 14.

In each of the division streams, NPs inserted by the splitter 21 and NP's included in the input stream (from the beginning) are present together.

C of FIG. 14 illustrates an example of NP-eliminated streams of the channels ch#1 and ch#2 acquired by the NP eliminating unit 32$_n$ for the division streams of the channels ch#1 and ch#2 illustrated in B of FIG. 14.

The NP eliminating unit 32$_n$, as described above, generates the NP-eliminated streams by eliminating NPs included in the division streams (streams after synchronization generated by the synchronization unit 31; therefrom).

Here, as illustrated in B of FIG. 14, there are cases where NPs inserted in a case where a division stream is generated by the splitter 21 and NP's originally included in the input stream are present together in the division stream.

In a case where NPs and NP's are present together in the division stream, when NP's are configured to be eliminated in addition to NPs by the NP eliminating unit 32$_n$, it is necessary to insert NP's in addition to the NPs in a case where a NP-inserted stream is generated by the NP inserting unit 63$_n$ of the reception device 12.

In a case where NPs (NP's) are inserted by the NP inserting unit 63$_n$, as described with reference FIG. 8, packets cannot be read from the buffer 64$_n$, and accordingly, in a case where many NPs (NP's) are continuously inserted, a buffer 64$_n$ having a large buffer amount is required.

Thus, in the transmission device 11, only NPs inserted in a case where division streams are generated by the splitter 21 are eliminated by the NP eliminating unit 32$_n$, and NP's that are originally included in the input stream may be caused to remain without being eliminated.

As above, by causing NP's that are originally included in the input stream not to be eliminated but to remain as they are, it can be prevented that a buffer 64$_n$ having a large buffer amount is required for the reception device 12.

In the NP-eliminated streams illustrated in C of FIG. 14, only NPs, which have been inserted by the splitter 21, included in the division streams illustrated in B of FIG. 14 are eliminated, and NP's that are included in the input stream from the beginning are not eliminated but remain as they are.

Figure 15:
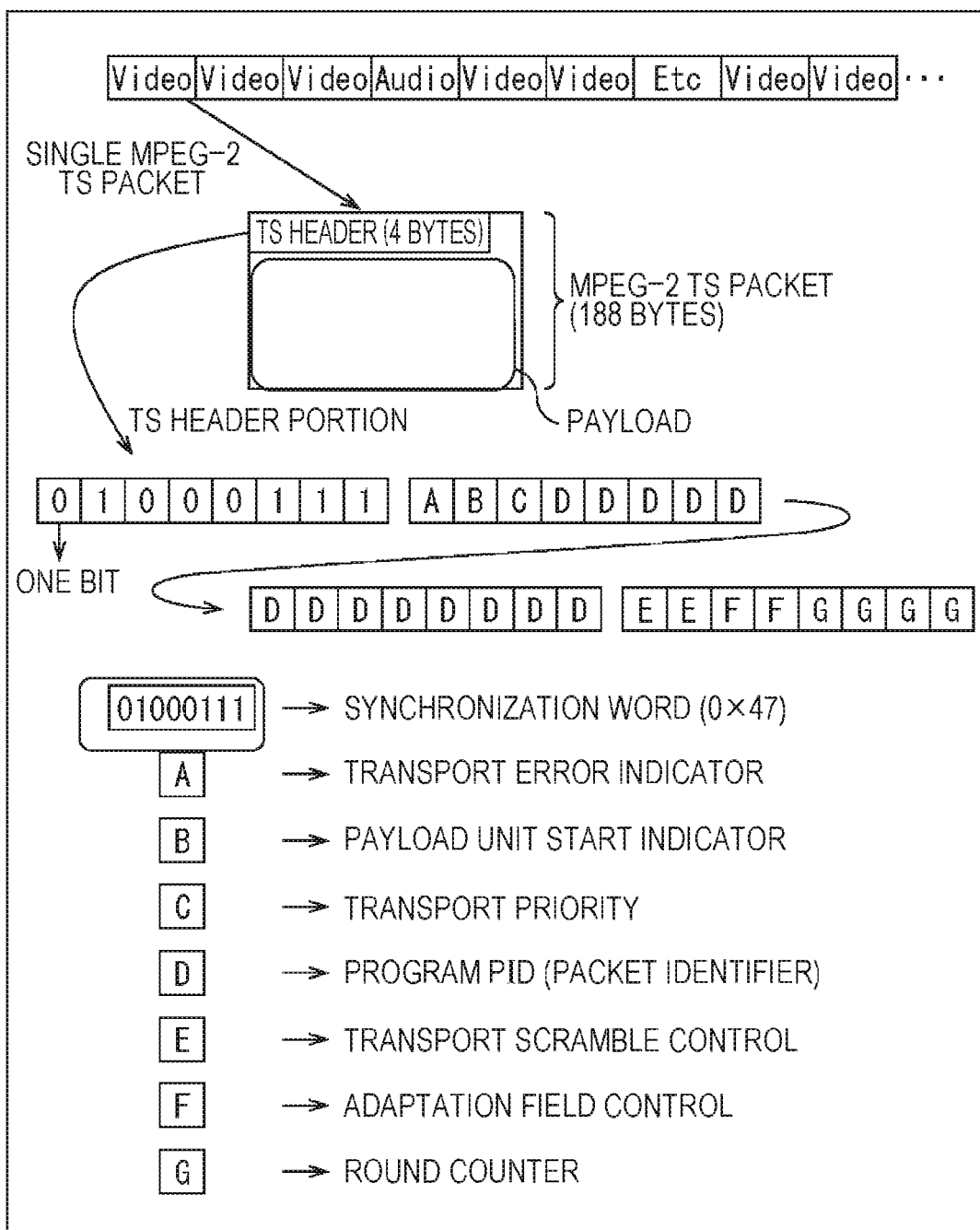
FIG. 15 is a diagram that illustrates an example of a method for discriminating NPs inserted by the splitter 21 and NP's originally included in an input stream from each other.

FIG. 15 is a diagram that illustrates an example of a method for discriminating NPs inserted by the splitter 21 and NP's originally included in an input stream from each other.

In order for the NP eliminating unit 32$_n$ of the transmission device 11 to eliminate only NPs inserted by the splitter 21 from the division streams (streams after synchronization acquired therefrom) and to cause NP's included in the input stream from the beginning not to be eliminated but to remain as they are, it is necessary to discriminate NPs inserted by the splitter 21 and NP's included in the input stream form the beginning from each other.

As a method for discriminating a NP inserted by the splitter 21 and a NP' included in the input stream from the beginning from each other, there is a method in which NULL identification information representing a NP inserted by the splitter 21 or a NP' included in the input stream from the beginning is included in a TS packet as the NP or the NP'.

FIG. 15 illustrates the format of the TS packet.

In a TS header of the TS packet, a program PID is included, and it can be recognized whether the TS packet is a NP (NP') based on the program PID.

As the NULL identification information, for example, it can be employed to set the most significant bit of a fixed synchronization word 0x47 (here, 0 x represents that a value following it is a hexadecimal number) included in the TS header to "1" and to set the synchronization word to 0xC7.

In addition, as the NULL identification information, for example, it may be employed to set a part or the whole of the payload of the TS packet (that is a NP or a NP') to a specific value representing a NP or a NP'. As the specific value, for example, a bit string in which only the most significant bit is "1", and the other bits are "0"s may be employed.

In addition, regarding the NULL identification information, a configuration in which NULL identification information representing a NP is included only in the NP, a configuration in which NULL identification information representing a NP' is included only in the NP', or a configuration in which NULL identification information representing a NP is included in the NP, and NULL identification information representing a NP' is included in the NP' may be employed.

However, in a case where the NULL identification information representing a NP' is included in the NP', for a process performed after the process of the NP eliminating unit 32$_n$, it is necessary to return the NP' to a state before the inclusion of the NULL identification information.

Accordingly, regarding the NULL identification information, it is preferable to include the NULL identification information representing a NP only in the NP.

Since a NP including the NULL identification information representing a NP is eliminated by the NP eliminating unit 32$_n$, there is no influence on a process performed after the process of the NP eliminating unit 32$_n$ (it is not necessary to return a NP including the NULL identification information representing a NP to a state before the inclusion of the NULL identification information).

<Size Identifier Representing Size of DNP>

Figure 16:
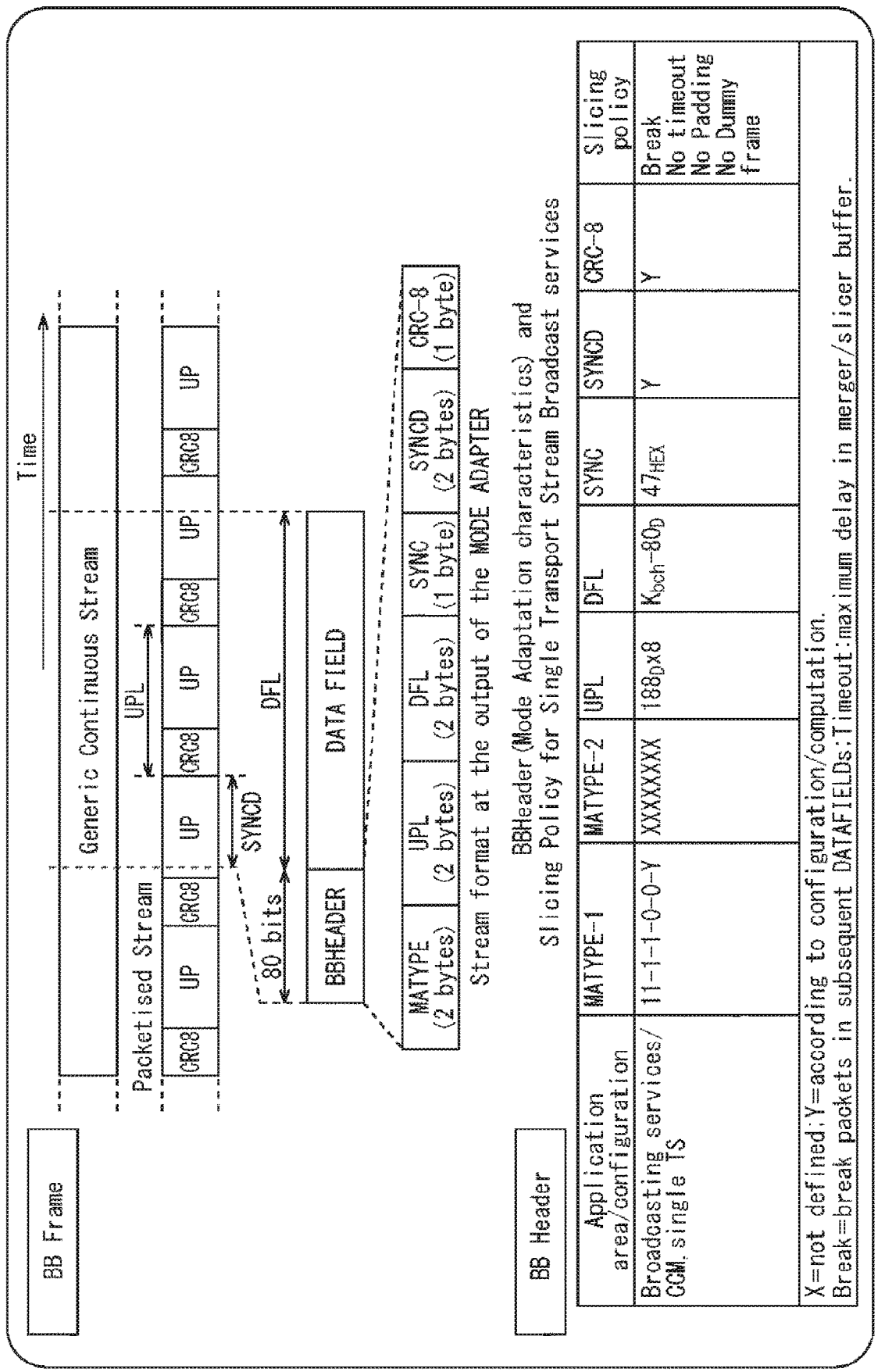
FIG. 16 is a diagram that illustrates a size identifier representing the size of a DNP.

FIG. 16 is a diagram that illustrates a size identifier representing the size of a DNP.

As described above, in a case where the NP eliminating unit $32_n$ eliminates NPs from a stream after synchronization and sets the stream after synchronization as a NP-eliminated stream, to the start of each packet of the NP-eliminated stream, a DNP of one byte representing the number of NPs eliminated from between the packet and the next packet is added.

According to the DNP of one byte, as the number of NPs eliminated from between a certain packet and the next packet, 0 to 255 can be represented.

In the splitter 21, in a case where the number N of channels for dividing an input stream into division streams is large, the number of continuous NPs in the division stream tends to be large.

However, in a case where the DNP is one byte, only up to 255 can be represented by the DNP of one byte. Thus, even in a case where continuous NPs corresponding to a number exceeding 255 are included in a stream after synchronization, the NP eliminating unit $32_n$ can eliminate only 255 NPs that are continuous.

Thus, as the size of the DNP, for example, two bytes larger than one byte may be employed.

According to the DNP of two bytes, 65535 (from 0) can be represented. Thus, the NP eliminating unit $32_n$, to the maximum, can eliminate continuous NPs corresponding to a large number of 65535.

However, since the DNP is added to the start of each packet of the NP-eliminated stream, in a case where the size of the DNP is two bytes, the overhead of the NP-eliminated stream is twice of that of a case where the size of the DNP is one byte.

In addition, in the splitter 21, in a case where the number N of channels for dividing an input stream into division streams is small, the number of continuous NPs in the division stream tends to be small. Thus, even in a case where the DNP of two bytes is employed, only NPs corresponding to a number that can be represented by the DNP of one byte are eliminated by the NP eliminating unit $32_n$ (NPs corresponding to a number exceeding a number that can be represented by the DNP of one byte are not eliminated).

Thus, in the transmission system illustrated in FIG. 1, as the size of the DNP, one byte or two bytes can be selected, and the FEC unit $33_n$ can generate a stream including signaling as a size identifier representing the size of the DNP and a NP-eliminated stream.

The FEC unit $33_n$, as described above, generates a stream of a BB frame by adding a BB header and necessary in-band signaling to one or more packets of the NP-eliminated stream of the channel ch#n supplied from the NP eliminating unit $32_n$.

The size identifier, for example, may be included in the BB header of a BB frame.

FIG. 16 illustrates the format of the BB frame.

As the size identifier, in the BB header of the BB frame, for example, a field in which a fixed value is set may be employed.

In other words, in the BB header, as examples of a field in which a fixed value is set, there are UPL of two bytes and SYNC of one byte. One or more bits of UPL or SYNC having such fixed values may be employed as the size identifier.

As described above, in a case where one byte or two bytes are selectively employed as the size of the DNP, one bit of UPL or SYNC having a fixed value is employed as the size identifier. For example, it may be configured such that, in a case where the size of the DNP is one byte, one bit of UPL or SYNC having a fixed value as the size identifier is caused to have the original value, and, in a case where the size of the DNP is one byte, one bit of UPL or SYNC having a fixed value as the size identifier has a value acquired by inverting the original value.

As the size of the DNP, not only one byte or two bytes, a size of three bytes or more may be employed.

As above, in a case where a stream of a BB frame including a size identifier is generated by the FEC unit $33_n$ of the transmission device 11, the NP inserting unit $63_n$ of the reception device 12 recognizes the size of the DNP included in the reception post-FEC stream, in other words, the NP-eliminated stream that is in the form of a BE frame based on the size identifier and inserts NPs corresponding to the number represented by the DNP of the size.

<Transmission of BUFS and BUFSTAT>

FIG. 17 is a diagram that illustrates the format of an ISSY.

In the ISSY, there are an ISCR, a BUFS, and a BUFSTAT.

The ISCR, as described above, is time information representing the transmission time of a packet and is information of two or three bytes.

The BUFS is information of (substantially) two bytes representing a buffer capacity (required buffer amount) that is required for the buffer $64_n$ in which a reception post-FEC stream is stored when the NP inserting unit $63_n$ restores the stream after synchronization as a NP-inserted stream by inserting NPs to the reception post-FEC stream.

In addition, two bits that are the fifth and sixth bits from the start of the bit string as the BUFS of two bytes (First Byte and Second Byte) are called BUFS_UNIT and represent the unit of the buffer capacity represented by the BUFS. On the other hand, 10 bits from the seventh bit to the last 16th bit represent the value of the buffer capacity.

In the reception device 12, for example, the NP inserting unit $63_n$ secures a storage area as the buffer $64_n$ of a buffer capacity represented by the BUFS and restores the stream after synchronization into a NP-inserted stream while writing the reception post-FEC stream into the buffer $64_n$.

The BUFSTAT is information of (substantial) two bytes representing read start time at which the NP inserting unit $63_n$ reads a packet from the buffer $64_n$ at the time of restoring the stream after synchronization as a NP-inserted stream by reading the packet stored in the buffer $64_n$ (the reception post-FEC stream).

In addition, two bits that are fifth and sixth bits from the start of the bit string as the BUFSTAT of two bytes (First Byte and Second Byte) are called BUFSTAT_UNIT and represent the unit of the read start time represented by the BUFSTAT. In addition, 10 bits from the seventh to the last 16th bits represent the value of the read start time. The 10 bits of the BUFSTAT represent the read start time using a data remaining amount of the buffer $64_n$ at the time of reading a packet from the buffer $64_n$.

In the reception device 12, for example, when a stream after synchronization is restored as a NP-inserted stream by the NP inserting unit $63_n$, reading of a packet from the buffer $64_n$ is started at timing (time) represented by the BUFSTAT.

In the ISSY as above, the ISCR is added by the synchronization unit $31_n$ of the transmission device 11 to each packet of the division stream so as to reconfigure an input stream by using the merging unit 52 of the reception device 12.

Thus, in a case where one ISSY can be added to each packet of the division stream, the ISCR is added to each packet, but the BUFS and the BUFSTAT cannot be added to the packet.

For this reason, the transmission device 11 needs to transmit signaling as the BUFS and the BUFSTAT using a method different from that of the ISCR.

The BUFS and the BUFSTAT, for example, similarly to the size identifier described above, may be included in the BB header of the BB frame of which the stream is generated by the FEC unit $33_n$.

FIG. 18 is a diagram that illustrates the format of the BB header.

As the BUFS and the BUFSTAT, similarly to the size identifier, for example, UPL or SYNC that is a field of the BB header in which a fixed value is set may be employed.

Here, in a case where all the size identifier, the BUFS, and the BUFSTAT are included in the BB header, for example, the BUFS and the BUFSTAT may be included in the UPL, and the size identifier may be included in the SYNC.

In addition, for example, the size identifier of one bit may be included in the SYNC of one byte of the BB header of each BB frame.

All the BUFS and the BUFSTAT are two bytes and thus, may be included in the UPL of two bytes of the BB header of each BB frame, for example, in a periodical (regular) manner such as an alternating manner.

<Another Method for Transmitting Size Identifier, BUFS, and BUFSTAT>

FIG. 19 is a diagram that illustrates another method for transmitting the size identifier, the BUFS, and the BUFSTAT.

In other words, FIG. 19 is a diagram that illustrates the format of the BB frame.

As described above, in-band signaling may be added to the BB frame.

In DVB-T2, while there are two types of in-band signaling including IN-BAND type A Signaling and IN-BAND type B Signaling, in the transmission system illustrated in FIG. 1, new in-band signaling (hereinafter, referred to as new in-band signaling) may be employed instead of such in-band signaling.

The new in-band signaling, as illustrated in FIG. 19, includes: a size identifier of one bit, BUFSTAT_UNIT of two bits, BUFSTAT (a value of the transmission start time as the BUFSTAT) of 10 bits, BUFS_UNIT of two bits, and BUFS (a value of the buffer capacity as the BUFS) of 10 bits.

In a case where a BB frame is generated by the FEC unit $33_n$ of the transmission device 11, the new in-band signaling is added to the BB frame.

In this embodiment, while the TS is employed as an input stream, a stream configured by a plurality of packets other than the TS may be employed as the input stream.

<Description of Computer According to Present Technology>

A series of the processes described above can be performed either by hardware or by software. In a case where the series of the processes is performed by software, a program configuring the software is installed to a general-purpose computer or the like.

Figure 20:
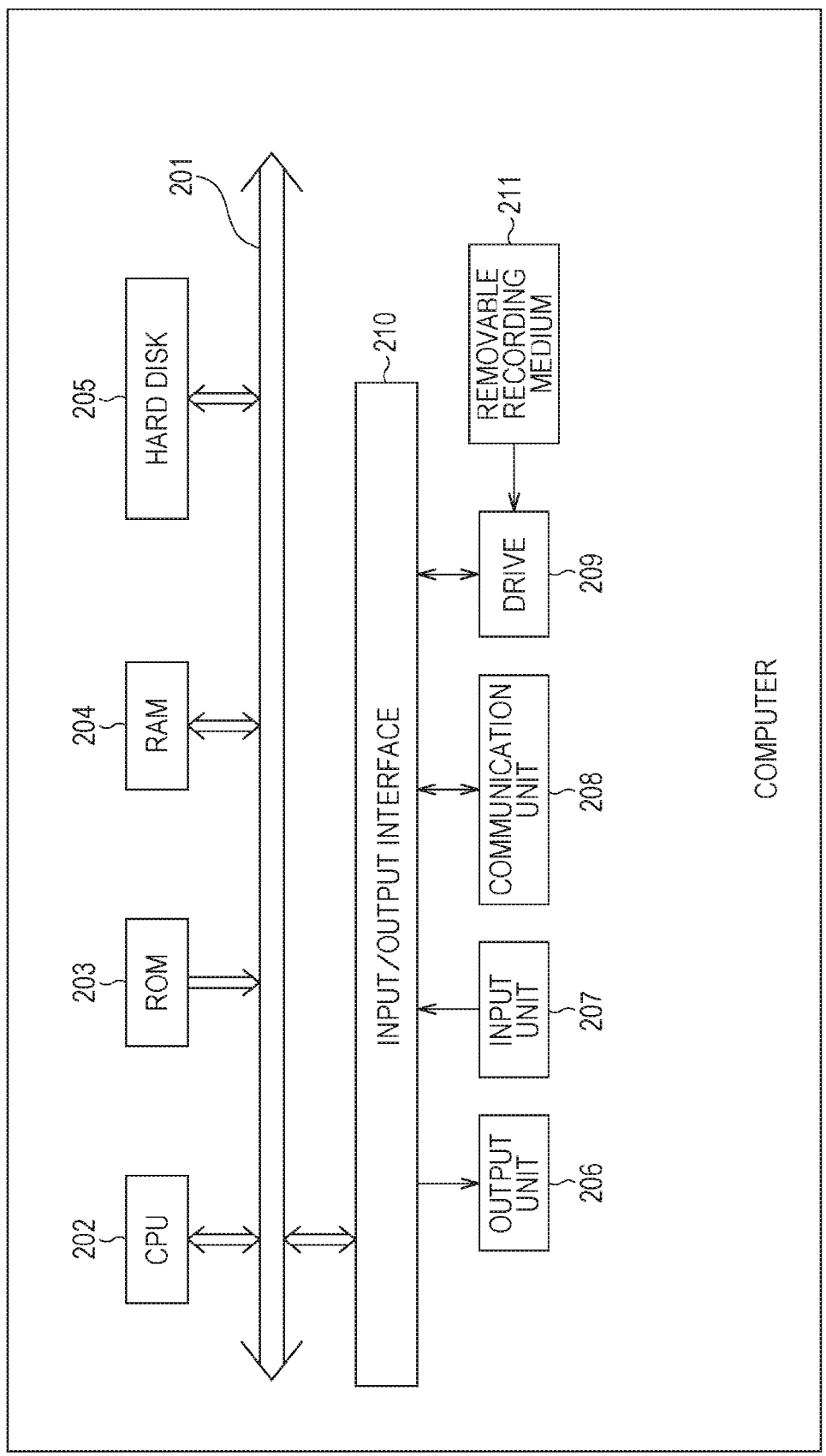
FIG. 20 is a block diagram that illustrates an example of the configuration of a computer according to an embodiment of the present technology.

FIG. 20 is a diagram that illustrates an example of the configuration of a computer according to an embodiment to which the program executing the series of processes described above is installed.

The program may be recorded in a hard disk 205 or a ROM 203 as a recording medium built in the computer in advance.

Alternatively, the program may be stored (recorded) on a removable recording medium 111. Such a removable recording medium 111 may be provided as so-called package software. Here, as examples of the removable recording medium 111, there are a flexible disk, a compact disc read only memory (CD-ROM), a magneto optical (MO) disk, a digital versatile disc (DVD), a magnetic disk, a semiconductor memory, and the like.

In addition, instead of installing the program to the computer from the removable recording medium 111 as described above, the program may be downloaded to a computer through a communication network or a broadcasting network and be installed to a built-in hard disk 205. In other words, the program, for example, may be transmitted from a download site to the computer in a wireless manner through satellites for digital satellite broadcasting or may be transmitted to the computer in a wired manner through a network such as a local area network (LAN) or the Internet.

The computer includes a central processing unit (CPU) 202 therein, and an input/output interface 110 is connected to the CPU 202 through a bus 201

When an instruction is input from a user through the input/output interface 110 by operating an input unit 207, the CPU 202 executes a program that is stored in the read only memory (ROM) 203 in accordance with the instruction. Alternatively, the CPU 202 loads a program stored in the hard disk 205 into a random access memory (R-RAM) 204 and executes the program.

In this way, the CPU 202 performs a process according to the above-described flowchart or a process performed based on the above-described configuration of the block diagrams. Then, as is necessary, the CPU 202 outputs the processing result, for example, from an output unit 206 through the input/output interface 110, transmits the processing result from the communication unit 208, and records the processing result in a hard disk 205.

The input unit 207 is configured by a keyboard, a mouse, a microphone, or the like, and the output unit 206 is configured by a liquid crystal display (LCD), a speaker, or the like.

Here, in this specification, the process executed by the computer in accordance with the program does not need to be performed necessarily in a time series in accordance with the sequence described in the flowchart. In other words, the process executed by the computer in accordance with the program includes a process (for example, a parallel processor a process using an object) that is performed in a parallel manner or in an individual manner.

In addition, the program may be processed by one computer or may be processed by a plurality of computers in a distributed manner. Furthermore, the program may be transmitted to a remote computer and be executed.

Furthermore, in this specification, a system represents an aggregation of a plurality of constituent elements (devices, modules (components), and the like) regardless whether all the constituent elements are arranged in a same casing. Thus, a plurality of devices that are housed in separate casings and are connected through a network and one device having a plurality of modules housed inside one casing are systems.

In addition, embodiments of the present technology are not limited to the embodiments described above, but various changes can be made therein in a range not departing from the concept of the present technology.

For example, the present technology may take the configuration of cloud computing in which one function is shared and processed together by a plurality of devices through a network.

Each step described in each flowchart described above may be either executed by one device or executed by a plurality of devices in a shared manner.

Furthermore, in a case where a plurality of processes are included in one step, the plurality of processes included in the one step may be either executed by one device or executed by a plurality of devices in a shared manner.

The effects described in this specification are merely examples but are not for the purposes of limitation, and any additional effect may be present.

REFERENCE SIGNS LIST

11 Transmission device
12 Reception device
13 Transmission line
21 Splitter
$22_1$ to $22_N$ Buffer
$23_1$ to $23_N$ Channel processing unit
26 Symbol clock generating unit
27 Time-related information generating unit
$31_1$ to $31_N$ Synchronization unit
$32_1$ to $32_N$ NP eliminating unit
$33_1$ to $33_N$ FEC unit
$34_1$ to $34_N$ MOD unit
$51_1$ to $51_N$ Channel processing unit
52 Merging unit
$61_1$ to $61_N$ DMD unit
$62_1$ to $62_N$ FEC unit
$63_1$ to $63_N$ NP inserting unit
$64_1$ to $64_N$
81 Buffer
82 Packet distributing unit
83 Channel selecting unit
91 Latch circuit
92, 93 Computing circuit
94 Selector
94 Comparison circuit
111 Channel selecting unit
$121_1$ to $121_3$ Counter
$122_1$ to $122_3$ Selection flag output unit
123 Selection control unit
201 Bus
202 CPU
203 ROM
204 RAM
205 Hard disk
206 Output unit
207 Input unit
208 Communication unit
209 Drive
110 Input/output interface
111 Removable recording medium

The invention claimed is:

1. A data processing device comprising:
processing circuitry configured to:
divide an input stream, the input stream including a plurality of packets at a plurality of respective slots, into a plurality of division streams,
for each division stream, and at each slot, insert a packet or a null packet (NP),
for each division stream, and at each slot, insert an input stream time reference (ISCR) to the end of each packet of the division stream,
for each division stream, eliminate NPs included in the division stream, where an ISCR added to the NP that is eliminated remains in the division stream,
generate an NP-eliminated stream, the NP-eliminated stream including, at a start of each packet, a number indicating NPs eliminated between the respective packet and a next packet in the NP-eliminated stream, and
generate a stream, the stream including the NP-eliminated stream and a size identifier representing a range of values of the number indicating NPs eliminated between the respective packet and next packet in the NP-eliminated stream, at the start of each packet.

2. The data processing device according to claim 1, wherein
the processing circuitry is further configured to generate the stream configured by a base band (BB) frame of DVB-S2, and the size identifier is included in a RB header or in-band signaling of the BB frame.

3. A data processing method comprising:
dividing an input stream, the input stream including a plurality of packets at a plurality of respective slots, into a plurality of division streams;
for each division stream, and at each slot, inserting a packet or a null packet (NP);
for each division stream, and at each slot, inserting an input stream time reference (ISCR) to the end of each packet of the division stream;
for each division stream, eliminating, via processing circuitry, NPs included in the division stream, where an ISCR added to the NP that is eliminated remains in the division stream;
generating, via the processing circuitry, an NP-eliminated stream, the NP-eliminated stream including, at a start of each packet, a number indicating NPs eliminated between the respective packet and a next packet in the NP-eliminated stream: and
generating, via the processing circuitry, a stream, the stream including the NP-eliminated stream and a size identifier representing a range of values of the number indicating NPs eliminated between the respective packet and a next packet in the NP-eliminated stream, at the start of each packet.

4. A data processing system comprising:
first processing circuitry configured to process an input stream, the input stream including a plurality of packets at a plurality of respective slots, transmitted from a data processing device, the first processing circuitry further configured to:
divide the input stream into a plurality of division streams, and for each division stream, and at each slot, insert a packet or a null packet (NP),
for each division stream, and at each slot, insert an input stream time reference (ISCR) to the end of each packet of the division stream, and
second processing circuitry configured to:
for each division stream, eliminate NPs included in the division stream, where an ISCR added to a NP that is eliminated remains in the division stream,
generate an NP-eliminated stream, the NP-eliminated stream including, at a start of each packet, a number indicating NPs eliminated between the respective packet and a next packet in the NP-eliminated stream, and generate a stream, the stream including the NP-eliminated stream and a size identifier representing a range of values of the number indicating NPs eliminated between the respective packet and a next packet in the NP-eliminated stream, at the start of each packet.

5. The data processing system according to claim 4, wherein the second processing circuitry is further configured to generate the stream configured by a base band (BB) frame of DVB-S2, and the size identifier is included in a BB header or in-band signaling of the BB frame.

6. A data processing method comprising:

processing, via first circuitry, an input stream, the input stream including a plurality of packets at a plurality of respective slots, transmitted from a data processing device;

dividing, via the first circuitry, the input stream into a plurality of division streams; and for each division stream, and at each slot, inserting a packet or a null packet (NT);

for each division stream, and at each slot, inserting an input stream time reference (ISCR) to the end of each packet or a NP of the division stream;

eliminating, via second circuitry, for each division stream, NPs included in the division stream, where an ISCR added to a NP that is eliminated remains as it is without being eliminated in the division stream;

generating via the second circuitry, an NP-eliminated stream, the NP-eliminated stream including, at a start of each packet, a number indicating NPs eliminated between the respective packet and a next packet in the NP-eliminated stream; and generating, via the second circuitry, a stream, the stream including the NP-eliminated stream, and a size identifier representing a range of values of the number indicating NPs eliminated between the respective packet and a next packet in the NP-eliminated stream, at the start of each packet.

7. The data processing device according to claim 2, wherein data of a user packet length (UPL) represents the size identifier.

8. The data processing device according to claim 7, wherein the UPL is included in the BB header.

9. The data processing device according to claim 2, wherein data of a sync field represents the size identifier.

10. The data processing device according to claim 9, wherein the sync field is included in the BB header.

\* \* \* \* \*